United States Patent [19]

Nagayama et al.

[11] Patent Number: 5,689,166
[45] Date of Patent: Nov. 18, 1997

[54] METHOD AND APPARATUS FOR CONTROLLING HYBRID EXCITATION TYPE PERMANENT MAGNET SYNCHRONOUS MOTOR

[75] Inventors: Kazutoshi Nagayama; Takayuki Mizuno; Tadashi Ashikaga, all of Tokyo, Japan

[73] Assignee: Kabushiki Kaisha Meidensha, Tokyo, Japan

[21] Appl. No.: 647,263

[22] Filed: May 13, 1996

Related U.S. Application Data

[63] Continuation of Ser. No. 243,888, May 17, 1994.

[30] Foreign Application Priority Data

| May 18, 1993 | [JP] | Japan | 5-115629 |
| Jan. 31, 1994 | [JP] | Japan | 6-9469 |
| Apr. 13, 1994 | [JP] | Japan | 6-75049 |

[51] Int. Cl.$^6$ .................................. H02P 5/00
[52] U.S. Cl. ........................... 318/721; 318/812
[58] Field of Search ............... 318/700, 711–719, 318/723, 799–815

[56] References Cited

U.S. PATENT DOCUMENTS

| 4,088,934 | 5/1978 | D'Atre et al. | 318/700 |
| 4,110,669 | 8/1978 | Akamatsu | 318/700 |
| 4,358,726 | 11/1982 | Iwakane et al. | 318/798 |
| 4,368,411 | 1/1983 | Kidd | 318/254 |
| 4,451,771 | 5/1984 | Nagase et al. | 318/800 |
| 4,460,860 | 7/1984 | Schwesig et al. | 318/721 |
| 4,460,861 | 7/1984 | Rosa | 318/722 |
| 4,527,109 | 7/1985 | Hosokawa et al. | 318/715 |
| 4,631,657 | 12/1986 | Hill et al. | 318/685 |
| 4,712,052 | 12/1987 | Omae et al. | 318/625 |
| 4,884,016 | 11/1989 | Aiello | 318/685 |
| 4,945,508 | 7/1990 | Benejean | 318/700 X |
| 4,988,940 | 1/1991 | Reng | 318/800 |
| 5,034,668 | 7/1991 | Bausch | 318/254 |
| 5,038,092 | 8/1991 | Asano et al. | 318/811 |
| 5,313,147 | 5/1994 | Yoneda et al. | 318/603 X |

FOREIGN PATENT DOCUMENTS

| 0085871 | 8/1983 | European Pat. Off. |
| 0167158 | 1/1986 | European Pat. Off. |
| 0201872 | 11/1986 | European Pat. Off. |
| 0325982 | 8/1989 | European Pat. Off. |
| 1563709 | 2/1970 | Germany |
| 3045575 | 7/1982 | Germany |
| 3426326 | 1/1986 | Germany |

OTHER PUBLICATIONS

T. M. Jahns, "Flux–Weakening Regime Operation of an Interior Permanent Magnet Synchronous Motor Drive," Conf. Record of the 1986 IEEE, 1986, pp. 814–822.

S. Ogasawara et al., "A High Performance AC Servo System with Permanent Magnet Synchronous Motors," IEEE Transactions on Industrial Electronics, vol. 33, No. 1, Feb. 1986, pp. 87–91.

*Primary Examiner*—Jonathan Wysocki
*Attorney, Agent, or Firm*—Foley & Lardner

[57] ABSTRACT

To extend an operable range of a hybrid excitation type permanent magnet synchronous motor having a field of a permanent magnet and a dc excitation coil, magnetic flux of the field is controlled so as to keep constant when a rotation speed of the motor is smaller than a predetermined base speed and so as to change in reverse proportion with the rotation speed of the motor when the rotation speed is larger than the predetermined base speed. Electric current and voltage to an armature of the motor is controlled such that a current ratio of a direct-axis component and a quadrature-axis component which components are obtained by dividing an electric current to the armature coil into the direct-axis component and the quadrature-axis component relative to the voltage induced in the armature coil, is kept constant.

36 Claims, 31 Drawing Sheets

MAXEFF = 95.28%

METHOD AND APPARATUS FOR CONTROLLING HYBRID EXCITATION TYPE PERMANENT MAGNET SYNCHRONOUS MOTOR

This application is a continuation of application Ser. No. 08/243,888, filed May 17, 1994.

BACKGROUND OF THE INVENTION

1. Field of the Invention

The present invention relates to method and apparatus for controlling a hybrid excitation type permanent magnet synchronous motor.

2. Description of the Prior Art

Conventionally, a speed control of a permanent magnet synchronous motor has been implemented such that three-phase current or voltage for controlling the inverter is produced by detecting a rotation speed of the motor and compensating the rotation speed command by the feedback of the detected rotation speed. On the other hand, in a torque control the feedback of the detected rotation speed has been implemented to a current command instead of the rotation speed command. In case that a constant-output operation of such a motor is implemented by keeping the power source voltage constant, as a method for broadening operable speed area of the motor by raising the maximum rotation speed, a so-called demagnetization control has been proposed, in which an electric current is applied to an armature coil for canceling the magnetic flux of the permanent magnet, in order to equivalently reduce induced voltage. FIG. 36 shows a characteristic curve obtained from such a demagnetization control.

SUMMARY OF THE INVENTION

It is an object of the present invention to a control method and control system of a hybrid excitation type permanent magnet synchronous motor, whose control method and system enable the operable speed range of the motor to be further broadened.

A motor control method according to the present invention is for a hybrid excitation type synchronous motor which has a field of a permanent magnet and a dc excitation coil. The motor is arranged such that magnetic flux of the field is controlled by adjusting dc electric current of the dc excitation coil. The method includes the steps of: controlling the magnetic flux of the field so as to keep constant when a rotation speed of the motor is smaller than a predetermined base speed and so as to change in reverse proportion with the rotation speed of the motor when the rotation speed is larger than the predetermined base speed; controlling electric current and voltage to the armature such that a current ratio of a direct-axis component and a quadrature-axis component which components are obtained by dividing an electric current to the armature coil into the direct-axis component and the quadrature-axis component relative to the voltage induced in the armature coil, is kept constant; and selecting at least one of the magnetic flux control and current-and-voltage control to control the motor.

Further according to the invention, there is provided a control system for a hybrid excitation type synchronous motor which has a field of a permanent magnet and a dc excitation coil. The motor is arranged such that magnetic flux of the field is controlled by adjusting dc electric current of the dc excitation coil. The control system is comprised of first control means which controls the magnetic flux of the field so as to keep constant when a rotation speed of the motor is smaller than a predetermined base speed and so as to change in reverse proportion with the rotation speed of the motor when the rotation speed is larger than the predetermined base speed. Second control means controls electric current and voltage to the armature such that a current ratio of a direct-axis component and a quadrature-axis component which components are obtained by dividing an electric current to the armature coil into the direct-axis component and the quadrature-axis component relative to the voltage induced in the armature coil, is kept constant. Selecting means selects at least one of the first and second control means to control the motor.

BRIEF DESCRIPTION OF THE DRAWINGS

In the drawings, like reference numeral designate like parts and elements throughout all figures, in which.

DETAILED DESCRIPTION OF THE INVENTION

FIGS. 1 to 4 show a structure of a hybrid excitation type permanent magnet synchronous motor whose control is realized by a method and control system according to the present invention.

Figure 1:
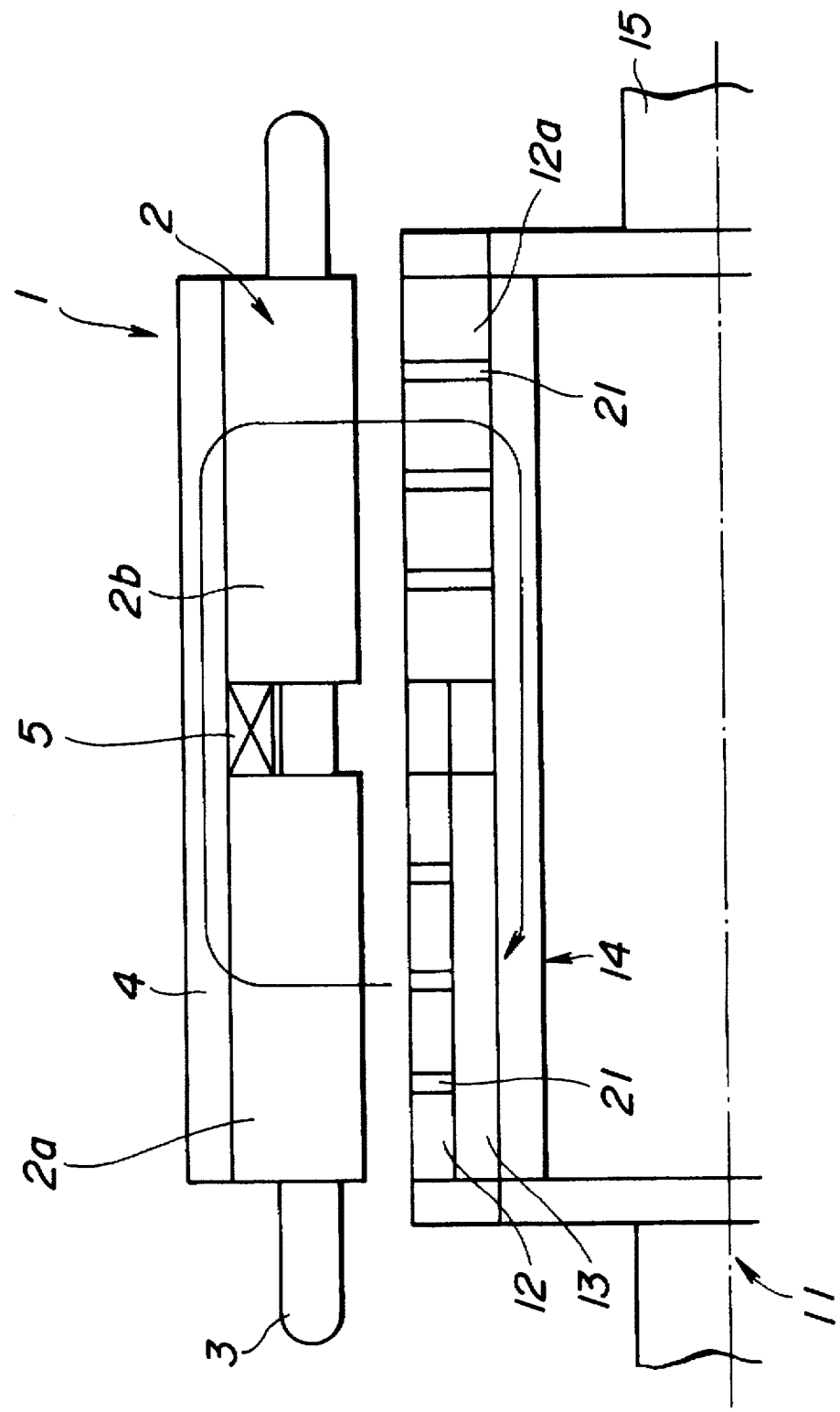
FIG. 1 is a structural view of a hybrid excitation type permanent magnet motor controlled by a control method according to the present invention.
Figure 4:
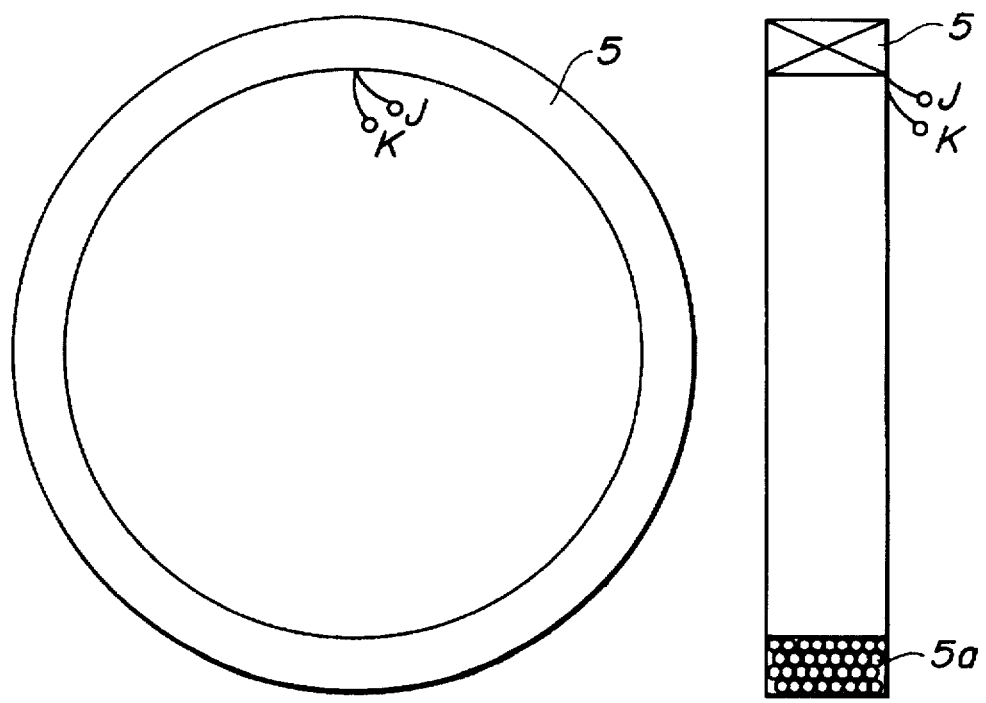
FIG. 4 is a structural view of an exiting coil of the motor of FIG. 1.

As shown in FIG. 1, an armature 1 of a stator is constituted by an armature core 2, an armature coil 3 and a cylindrical yoke 4. The armature core 2 is divided into two parts in the axial direction of the motor. One side of the armature core 2 is a N-pole core 2a, and the other side of the armature core 2 is a S-pole core 2b. A ring-shaped DC (direct current) excitation coil 5 as shown in FIG. 4 is disposed between the N-pole core 2a and the S-pole core 2b. The N-pole and S-pole cores 2a and 2b are magnetically connected with each other through the yoke 4 and mechanically supported by the yoke 4. The armature coil 3 is disposed so as to cross the N-pole and S-pole cores 2a and 2b. The excitation coil 5 is formed by winding a wire 5a and treating it by the insulation process. The number of turns of the excitation coil 5 is adjusted so as to generate a necessary magnetomotive force upon matching with a capacity of the electric source and the machinery dimension.

Figure 2B:
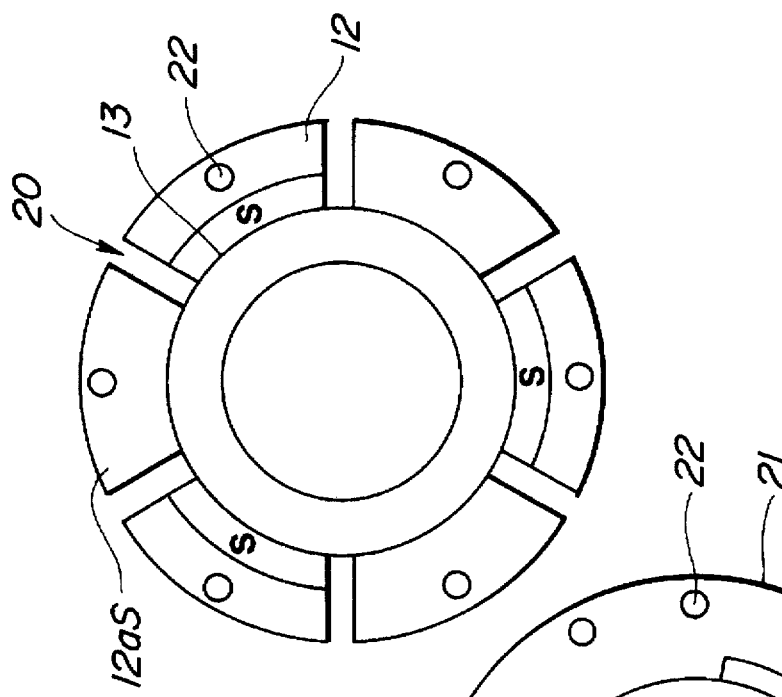
FIGS. 2A, 2B and 2C are structural views of a rotor of the motor of FIG. 1.
Figure 2C:
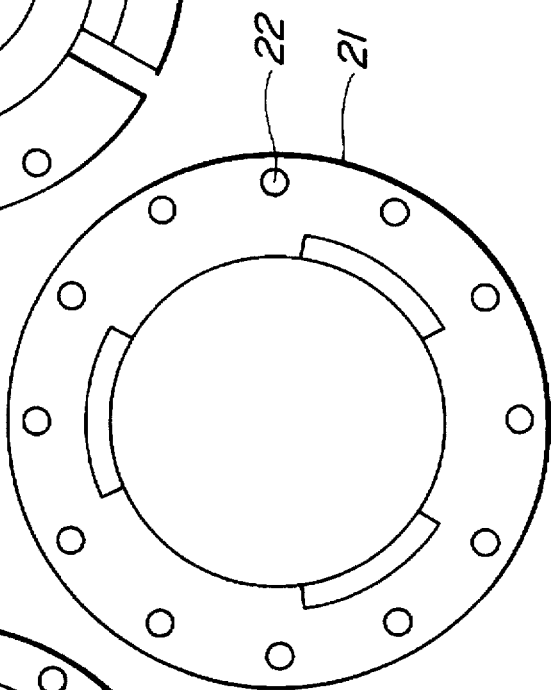
Figure 2A:
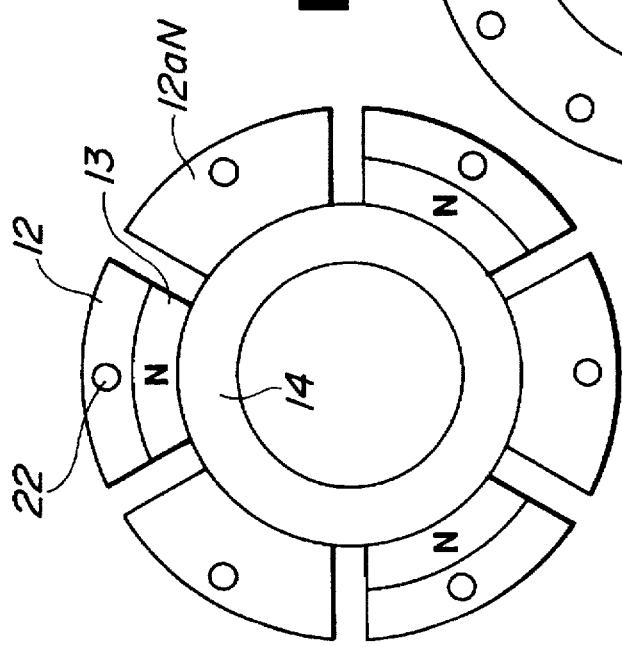

A rotor 11 is constituted by a rotor core 12 and a plurality of permanent magnets (PM) 13. The rotor core 12 is fixedly supported to a yoke 14 connected to a shaft 15. The rotor core 12 has salient pole portions 12a which project form the rotor core 12 and function as a salient pole, and the salient pole portions 12a are disposed at portions where the permanent magnets 13 are not located. As shown in FIGS. 1, 2A and 2B, the permanent magnet 13 is embedded in the rotor 11 and covered with the rotor core 12. A slit 20 is formed between each permanent magnet 13 and each pole salient portion 12a in relation such that the permanent magnets 13 and the salient pole portions 12a are fixed on the yoke. In order to reinforce the rotor 11, non-magnetic reinforcement plates 21 as shown in FIG. 2C are disposed in the several portions in the axial direction. The non-magnetic reinforcement plates 21, the salient pole portions 12a and the rotor cores 12 are integrally fitted with each other by inserting aluminum-alloy die-cast member or copper bar to slots 22. The inserted member and a pair of end rings installed at an axial end form an electric current passage. The salient pole portions 12a are divided into N-pole salient pole portions 12aN and S-pole salient pole portions 12aS which are dividedly disposed so as to be opposite to the N-pole and S-pole cores 2a and 2b, respectively. The permanent magnets 13 are fixedly attached on the rotor core 12, and the rotor core 12 is inserted into the yoke 12 to be supported thereby.

The N-pole and S-pole salient pole portions 12aN and 12aS are formed such that the length thereof corresponds to those of the N-pole core 2a and the S-pole core 2b, respectively, and that width thereof are constant along the circumferential direction. Further, the N-pole salient pole portions 12aN are arranged side by side with the N-pole side of the permanent magnets 13, as shown in FIG. 2A. The S-pole salient pole portions 12aS are arranged side by side with the S-pole sides of the permanent magnets 13, as shown in FIG. 2B. Furthermore, the N-pole salient pole portion 12aN and the S-pole side of the permanent magnets 13 are aligned along the axial direction of the motor at predetermined intervals. Similarly, the S-pole salient pole portion 12aS and the N-pole side of the permanent magnets 13 are aligned along the axial direction of the motor at predetermined intervals.

Figure 3:
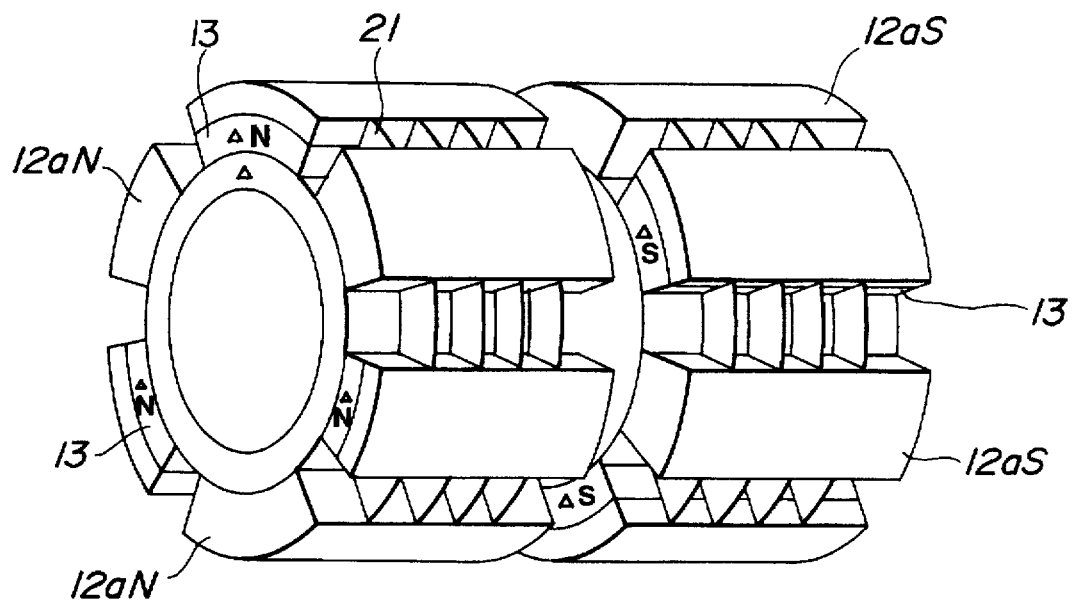
FIG. 3 is a perspective view of a rotor of the motor of FIG. 1.

That is, the rotor 11 is formed as shown in FIG. 3, in which the N-pole salient pole portions 12aN and the N-pole side of the permanent magnets 13 are alternately arranged in the circumferential direction. The S-pole salient pole portions 12aS and the S-pole side of the permanent magnets 13 are alternately arranged in the circumferential direction. Furthermore, the arrangement units of the N-pole side and the S-pole side are separated with each other by a width of the excitation coil 5, and the salient pole portions 12a and the permanent magnets 13 are aligned in the axial direction. The number of the salient pole portions 12a is the same as that of the permanent magnets 13.

Although the motor in FIGS. 1 to 3 has been shown and described such that the permanent magnet 13 is disposed at six poles, it will be understood that the number of the poles is not limited to six. Furthermore, while the motor of FIGS. 1 to 3 has been shown and described such that the surface of the salient pole portion 12a and that of the permanent magnet 13 are located within a same circumferential surface, the salient pole portions 12a may be formed to further project toward the armature 1 so as to reduce the gap between the salient pole portions 12 and the armature 1. This arrangement will cause an effect that the magnetic flux passing through the salient pole portions 12 is increased. Because of the same reason, the width of the salient pole portions 12a may be broadened.

Referring to FIGS. 6 to 35, there are shown embodiments of a control system of the above-mentioned motor, according to the present invention.

In general, a quadrature-axis reactance $X_q = \omega L_q$ ($\omega$: electric source angle frequency, $L_q$: a quadrature-axis self-inductance) and a direct-axis reactance $X_d = \omega L_d$ ($L_d$: direct-axis self-inductance) exist in a motor. A voltage-equation and a generated torque thereof are represented by the following equations (1) and (2), respectively:

$$\begin{bmatrix} V_d \\ V_q \end{bmatrix} = \begin{bmatrix} R_1 + L_d P & -\omega L_q \\ \omega L_d & R_1 + L_q P \end{bmatrix} \begin{bmatrix} i_d \\ i_q \end{bmatrix} + \begin{bmatrix} 0 \\ \omega \Lambda \end{bmatrix} \quad (1)$$

$$T = \frac{\text{Pole}}{2} \{\Lambda i_q + (L_d - L_q) i_d i_q\} \quad (2)$$

where $V_d$ is a voltage on a direct-axis, $V_q$ is a voltage on a quadrature-axis, id is a current on the direct-axis, $i_q$ is a current on the quadrature-axis, $R_1$ is a coil resistance, $\Lambda$ is the number of an interlinkage magnetic-flux lines, Pole is the number of poles, and P is a differential operator P=d/dt (t is time).

In general, $\Lambda$ can be generally expressed by a function of a direct-current excitation current $I_f$, that is, $\Lambda = f(I_f)$. Accordingly, it is possible to control the field magnetic flux by the control of $I_f$.

Above-described equations are used as a basic equation in a wide-range variable speed control method of a motor having a DC exciting-current coil.

Control of a brushless DC motor

The manner of operation of the control of a brushless DC motor in a permanent magnet embedded type hybrid excitation type permanent magnet motor will be discussed hereinafter.

In a normal brushless DC motor, assuming that $I_d$ is set at 0 ($I_d$=0), only $I_q$ is applied to the motor, and $\Lambda$ is controlled such that $\Lambda$ is kept constant at a speed lower than a base speed and $\Lambda$ is varied in reverse-proportion with a rotation speed of the motor at a speed higher than a base speed to ensure a constant-output properties; a constant-torque output characteristic is obtained. In this case, the generated torque is represented by the following equation (3):

$$T = \frac{\text{Pole}}{2} \cdot \Lambda I_q \quad (3)$$

Figure 5:
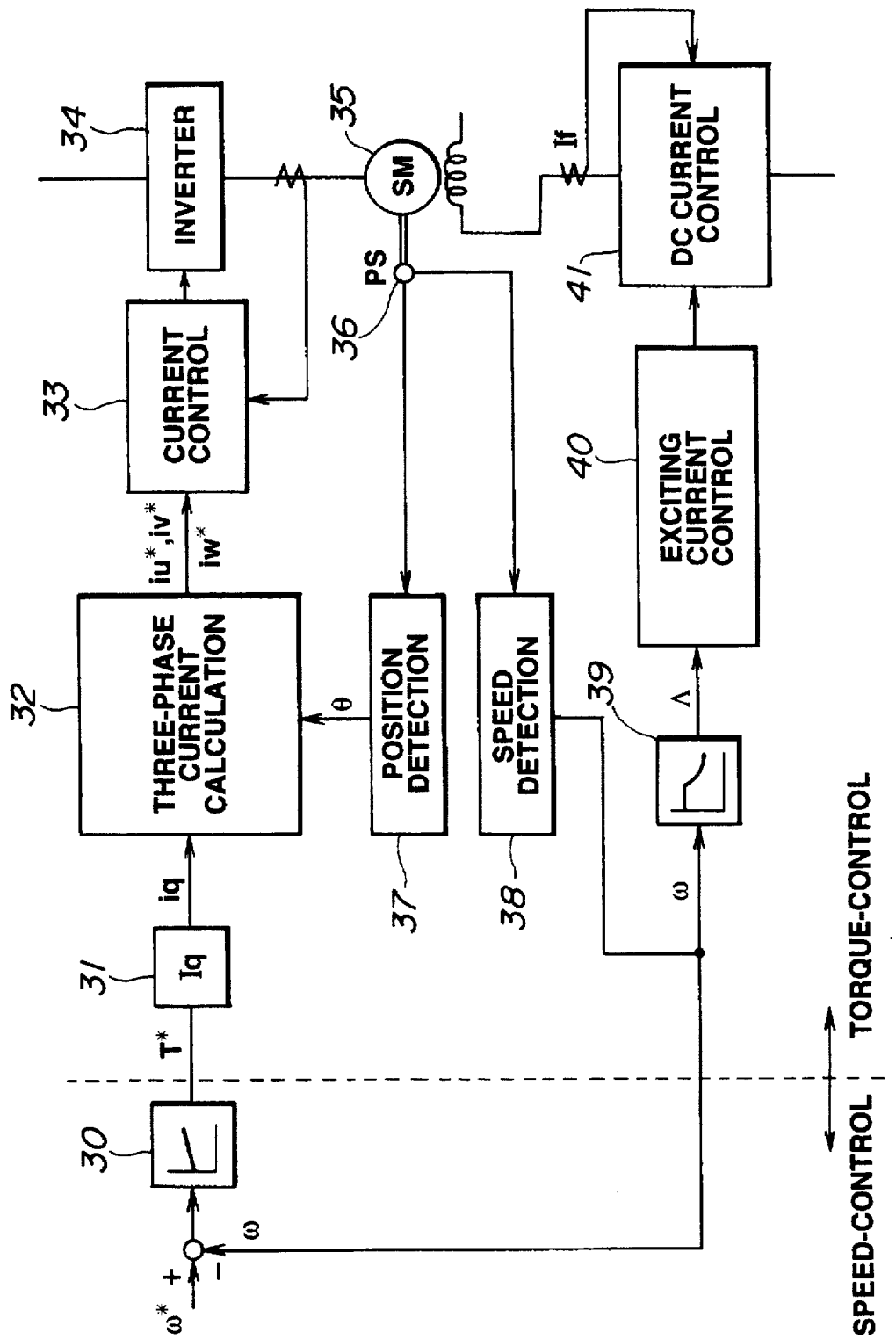
FIG. 5 is a block diagram of a first embodiment of a motor control system of a hybrid excitation type permanent magnet motor according to the present invention.

FIG. 5 shows a control system of a brushless DC motor in which $I_d$ is kept at 0 ($I_d$=0 control). The control system is of a speed control system whose main circuit comprises a torque calculator 30 for obtaining a torque T* from a command speed ω*, an electric current calculator 32 for obtaining a quadrature-axis electric current $I_q$ from the torque T*, a three-phase electric current calculator 31 for obtaining a three-phase electric current from the quadrature-axis electric current by applying the equation (3) and the following equations (4), a current controller 33, and an inverter 34.

$$i_u = \sqrt{2} \, I_1 \cos\theta$$

$$i_v = \sqrt{2} \, I_1 \cos\left(\theta - \frac{2}{3}\pi\right) \quad (4)$$

$$i_w = \sqrt{2} \, I_1 \cos\left(\theta + \frac{2}{3}\pi\right)$$

where θ is a rotor position angle, $I_1 = I_q/\sqrt{3}$.

A rotation speed of the motor 35 is controlled by the inverter 34 and detected by a rotation speed detector 36. The detected signal by the rotation speed detector 36 is inputted as a rotational position to the three-phase current calculator 32 through a position detecting circuit 37. Further, the detected signal by the rotation speed detector 36 is modulated as a present speed in a speed detecting circuit 38 and is then added to the speed command ω*. The modulated signal at the speed detecting circuit 38 is transformed into a field-magnet magnetic flux $\Lambda$ at an calculator 39. An excitation current calculator 40 obtains an electric current if from the field magnetic-flux, and a DC electric current control circuit 41 is controlled according to the obtained electric current if. Accordingly, the exciting current is varied according to the speed such that the field magnetic-flux $\Lambda$ is kept constant when the speed is lower than a base speed and is gradually decreased in reverse proportion with the speed when the speed is higher than the base speed. This control extends an operable speed area of the motor 35.

If the control system of FIG. 5 is used as a torque control, the left hand side part divided by a broken line of FIG. 5 is not necessary in such a torque control system.

Control during low speed and/or low-load operation

In addition to the above-mentioned current control, this embodiment provides a further improved control by which the motor 35 is operable in a further low-speed and low-torque control by utilizing the characteristics that the quadrature-axis reactance of this motor 35 is large. Assuming that the motor 35 is put in a stationary condition in which $R_1$ is neglected since the $R_1$ is extremely small as compared with the reactance in the equations (1) and (2), the equations (1) and (2) are expressed by the following equations (5) and (6):

$$\begin{aligned} V_d &= -\omega L_q I_q \\ V_q &= \omega L_d I_d + \omega \Lambda \end{aligned} \quad (5)$$

$$T = \frac{\text{Pole}}{2} \{\Lambda I_q + (L_d - L_q) I_d I_q\} \quad (6)$$

If the equation (5) is applied to a high-speed condition, $\omega\Lambda$ and $I_d$ become considerably large. Therefore, the equation (5) is applied only for a low-speed and/or low-load operation. The voltage of the motor terminal is obtained from the equation (5) as follows:

$$\begin{aligned} V &= \sqrt{V_d^2 + V_q^2} \\ &= \sqrt{(\omega L_q I_q)^2 + (\omega L_d I_d + \omega \Lambda)^2} \end{aligned} \quad (7)$$

When a possible output voltage of the inverter is $V_{max}$, the motor is operable within the range in that $V \leq V_{max}$. That is, the operable range of the motor is under a condition $V \leq V_{max}$.

It is assumed that the ratio between $I_d$ and $I_q$ is constant in order to uniformly determine the electric current relative to the torque command. That is, when the ratio between the $I_d$ and $I_q$ is K, the following equation (8) is obtained.

$$I_d = K I_q \quad (8)$$

By applying the equation (8) to the equation (6), the following equation (9) is obtained.

$$T = \frac{\text{Pole}}{2} \{\Lambda I_q + (L_d - L_q) K I_q^2\} \quad (6)$$

$$(L_d - L_q) K I_q^2 + \Lambda I_q - \frac{2T}{\text{Pole}} = 0$$

$$I_q = \frac{-\Lambda + \sqrt{\Lambda^2 + 8(L_d - L_q) K \frac{T}{\text{Pole}}}}{2(L_d - L_q) K} \quad (9)$$

As is clear from the equation (9), if the magnetic flux $\Lambda$ is constant and the torque T is obtained, the electric current $I_q$ is obtained.

Figure 6:
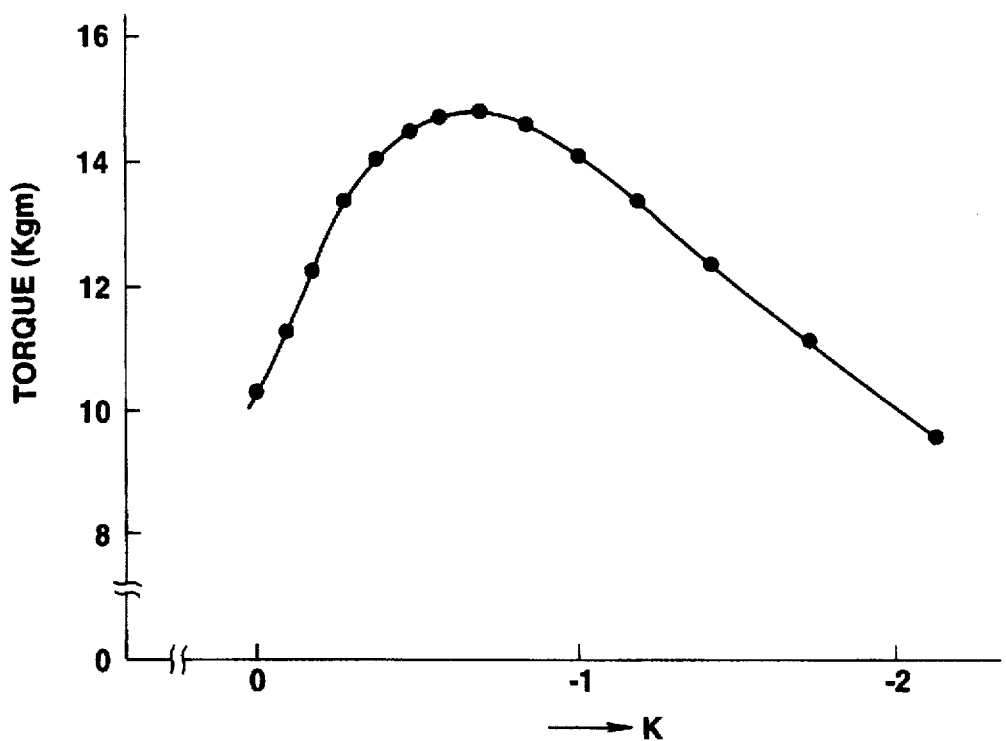
FIG. 6 is a characteristic curve between a torque and a value K of FIG. 1.

In order to obtain an experimental data relative to the value K, as to a hybrid excitation type permanent magnet motor designed as a 45 kW-8 pole motor, the relationship between the value K and the torque was searched in a condition that $I_1$ is kept at 200A ($I_1$=200A). FIG. 6 shows such examination data which indicates that the torque T is largely varied according to the value K. The result of FIG. 6 indicates that it is preferable to set the value K within a range from $-0.3$ to $-1.2$ as compared with the control at K=0 ($I_d=0$), in order to effectively obtain the output torque T. Although the torque T is determined from the value K and the primary current, it is preferable to set K<0 in a K value constant control in order to obtain a high-torque relative to the small electric current.

Figure 7:
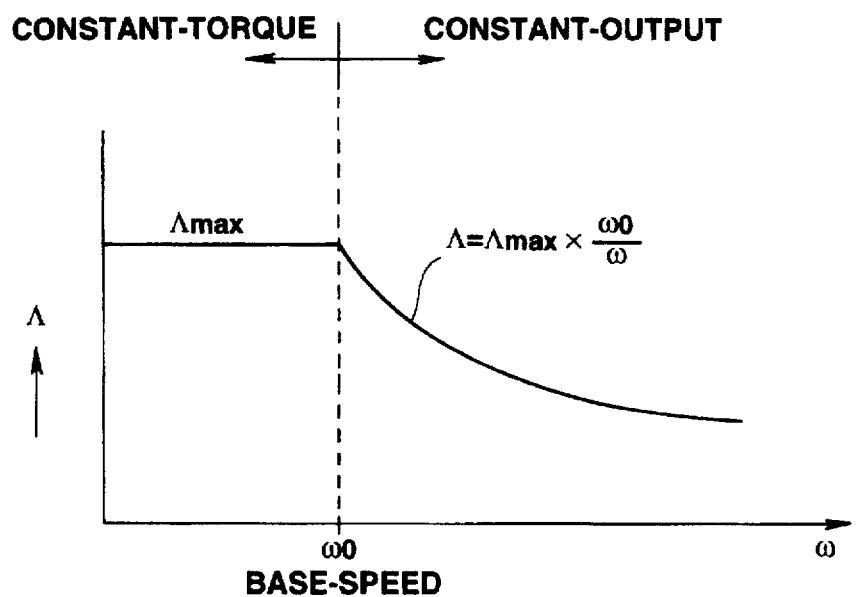
FIG. 7 is a characteristic curve between $\Lambda$ and $\omega$.

If the value K is determined as mentioned above and the interlinkage magnetic flux $\Lambda$ is varied within the torque-constant range at a speed higher than the base speed as shown in FIG. 7, the electric current value $I_q$ is unequivocally determined relative to the torque T. In FIG. 7, $\Lambda_{max}$ is a maximum value of $\Lambda$ which is determined from the magnetic saturation, and $\Lambda$ is a multiple of $\Lambda_{max}$ and the speed ratio $\omega 0/\omega$ ($\Lambda = \Lambda_{max} \times \omega 0/\omega$). As a result, $I_q$ is obtained from the determination of K and $\Lambda$ in the equation (9), and $I_d$ is obtained from the equation (8). Accordingly, each of phase currents is obtained as follows:

$$i_u = \sqrt{2}\, I_1 \sin\theta \quad (4)$$

$$i_v = \sqrt{2}\, I_1 \sin\left(\theta + \phi - \frac{2}{3}\pi\right) \quad (10)$$

$$i_w = \sqrt{2}\, I_1 \sin\left(\theta + \phi + \frac{2}{3}\pi\right)$$

where Q is a rotor position angle, $\phi = \tan^{-1}(I_q/I_d)$, $I_1 = \sqrt{(I_d^2 + I_q^2)/3}$.

As a result, if the K value is set at minus, the direct-axis current $I_d$ becomes minus. This lowers $V_q$ and the operable range of the motor is extended.

Figure 8:
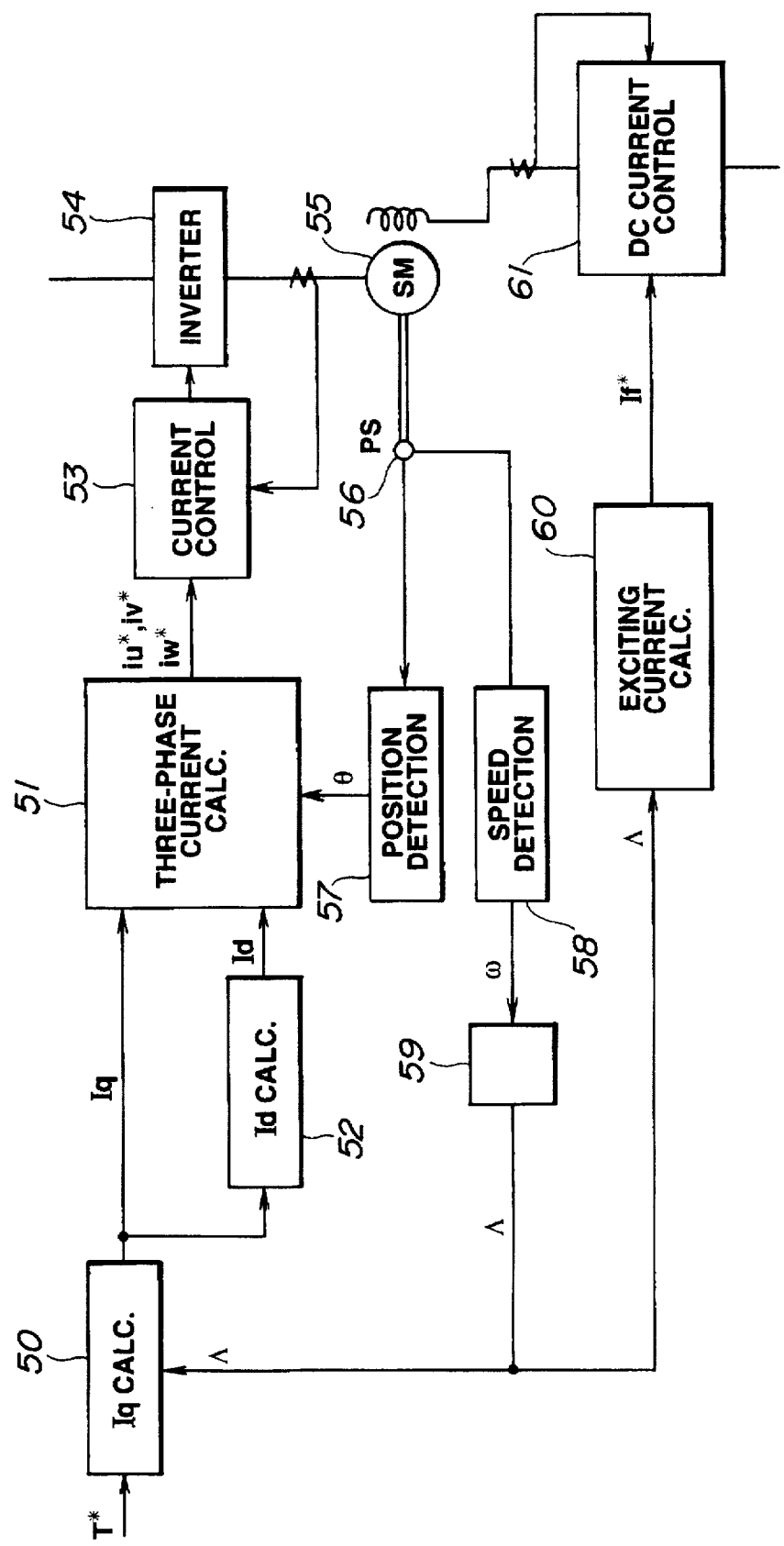
FIG. 8 is a block diagram of a second embodiment of a motor control system according to the present invention.

FIG. 8 shows a block diagram of a $I_d$-$I_q$ ratio constant control system of a torque control circuit. The quadrature-axis current $I_q$ is obtained from the torque command T* and a feed-back magnetic flux command $\Lambda$ in a calculator 50. A three-phase current calculator receives the $I_q$ and the $I_d$ obtained by the multiplication $I_q$ and K. The electric current values $i_u$, $i_v$, $i_w$ of the equation (10) are outputted from the three-phase current calculator 51 and inputted to an inverter 54 through a current controller 53. Upon receipt of the electric current, the inverter 54 is operated.

The detected value by a rotation speed detector 56 for a motor 55 is inputted to the three-phase current calculator 50 after modulated as a rotational position in a position detecting section 57. A speed detecting section 58 receives the detected value at the rotation speed detector 56 and outputs a speed $\omega$. The speed $\omega$ is inputted to a calculator 59, which has a property shown in FIG. 8 and outputs the magnetic flux $\Lambda$. The output $\Lambda$ from the calculator 59 is inputted to the $I_q$ calculator 50 and an exciting current calculator 60. An electric current $i_f$ is outputted from the exciting current calculator 60 and inputted to a DC current controller 61.

Figure 9:
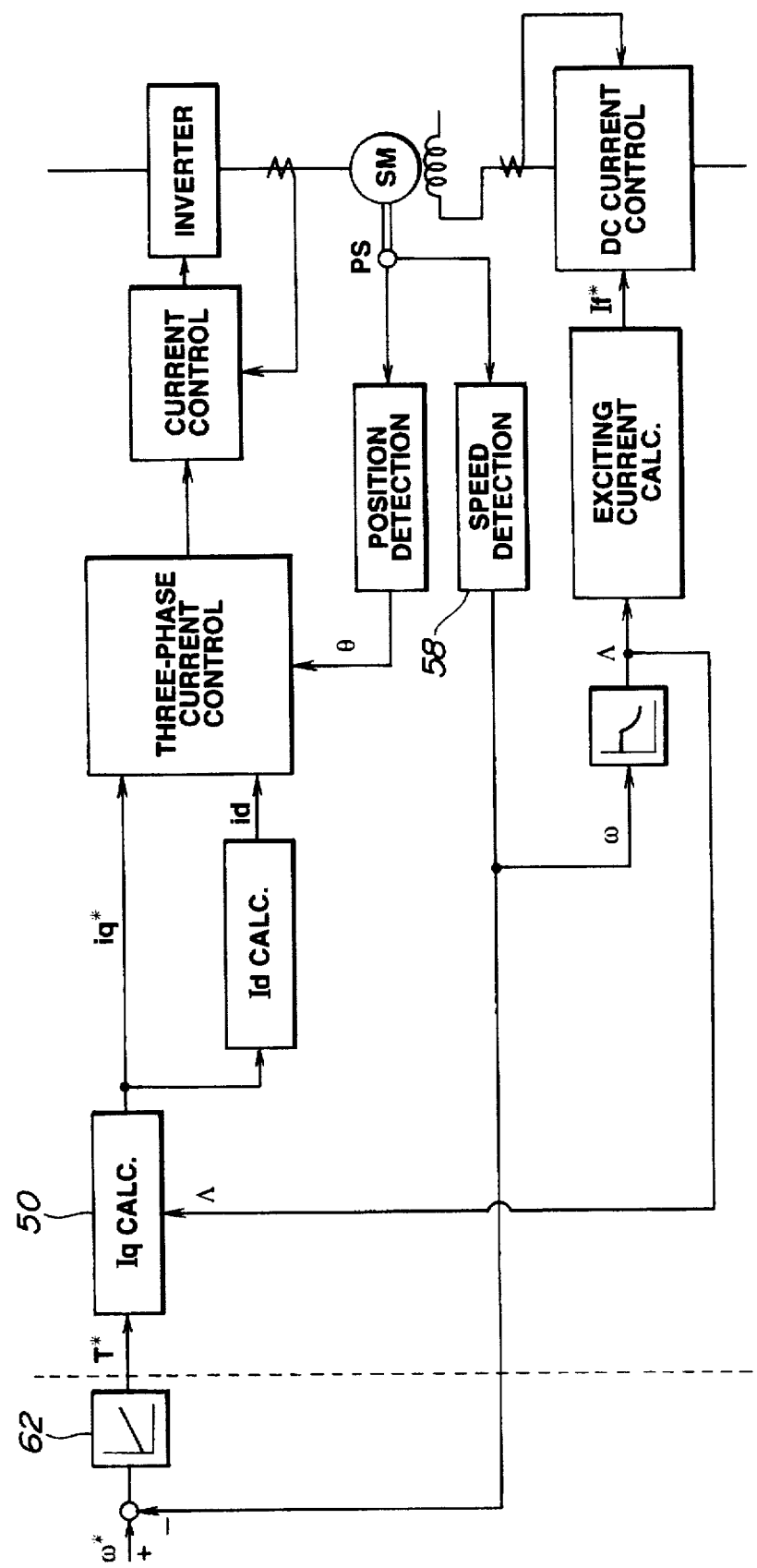
FIG. 9 is a block diagram of a speed control circuit.

FIG. 9 shows a speed control circuit to which a speed command $\omega$* is inputted. The speed control circuit is generally similar to the torque control circuit of FIG. 8 except that a torque calculator 62 for calculating a torque command T* from the speed command $\omega$* is provided in front of the $I_q$ calculator 50 and a feed back command from a speed detecting section 58 is added to the speed command $\omega$*.

Control at high-speed range or heavy-loading

Although at low-speed range of light-loading the operating property of the motor is improved by changing the magnetic flux $\Lambda$ while keeping K constant, in the case of high-speed or heavy-loading the voltage V in the equations (6) and (7) frequently exceeds the maximum voltage $V_{max}$ of the inverter due to the increase of the speed $\omega$. Accordingly, in this control the motor is operated by keeping the voltage V at $V_{max}$ (V=$V_{max}$). From the equation (7) and V=$V_{max}$, the following equation (11) is derived.

$$V_{max}^2 = (\omega L_q I_q)^2 + (\omega L_d I_d + \omega \Lambda)^2$$

$$I_d = \frac{1}{\omega L_d}\left\{ \sqrt{V_{max}^2 - (\omega L_q I_q)^2} - \omega \Lambda \right\} \quad (11)$$

Although the equation (11) shows $I_q$ for keeping the terminal voltage at Vmax, in order to facilitate the control, the root part of the equation (11) is set at 0 ($V_{max}^2 - (\omega L_q I_q)^2 = 0$). That is, so as to satisfy the equation (12) the magnetic flux $\Lambda$ is changed for the control of torque.

$$I_q = V_{max}/\omega L_q \quad (12)$$

When $I_q$ is controlled according to the equation (12), $I_d$ is represented as follows:

$$I_d = -\Lambda/L_d \quad (13)$$

By substituting the equations (12) and (13) into the equation (6), the following equation (14) is obtained.

$$T = \frac{\text{Pole}}{2}\left\{ \Lambda \frac{V_{max}}{\omega L_q} + (L_d - L_q)\cdot\left(-\frac{\Lambda}{L_d}\right)\left(\frac{V_{max}}{\omega L_q}\right) \right\} \quad (14)$$

$$= \frac{\text{Pole}\, V_{max}}{2\,\omega L_d}\Lambda$$

As is clear from the equation (14), when the speed $\omega$ is kept constant, the torque T is in proportion with the number $\Lambda$ of the interlinkage magnetic flux. Accordingly, the torque control is carried out by controlling $\Lambda$. In this control, from the equations (5) and (13), $V_q = \omega L_d I_d + \omega \Lambda = 0$ is obtained. Accordingly, when the torque command is applied, the following equation (15) is obtained.

$$\Lambda = \frac{2\omega L_d T}{\text{Pole}\cdot V_{max}} \quad (15)$$

As a result, $V_{max}$ of the equation (15) is decided by the inverter, and by obtaining $\Lambda$ after the detection of $\omega$, $I_q$ and $I_d$ represented by the equations (12) and (13). Accordingly, it is possible to extend the operable range of the motor by controlling $I_q$ and $I_d$ so as to keep $V_{max}$ constant, that is, by keeping $V_q=0$.

Since $\Lambda$ is saturated if too large, it should be kept to be smaller than $\Lambda_{max}$. That is, the maximum torque is limited by the following equation (16):

$$T_{max} = \frac{\text{Pole}}{2}\frac{V_{max}}{\omega L_d}\Lambda_{max} \quad (16)$$

Figure 10:
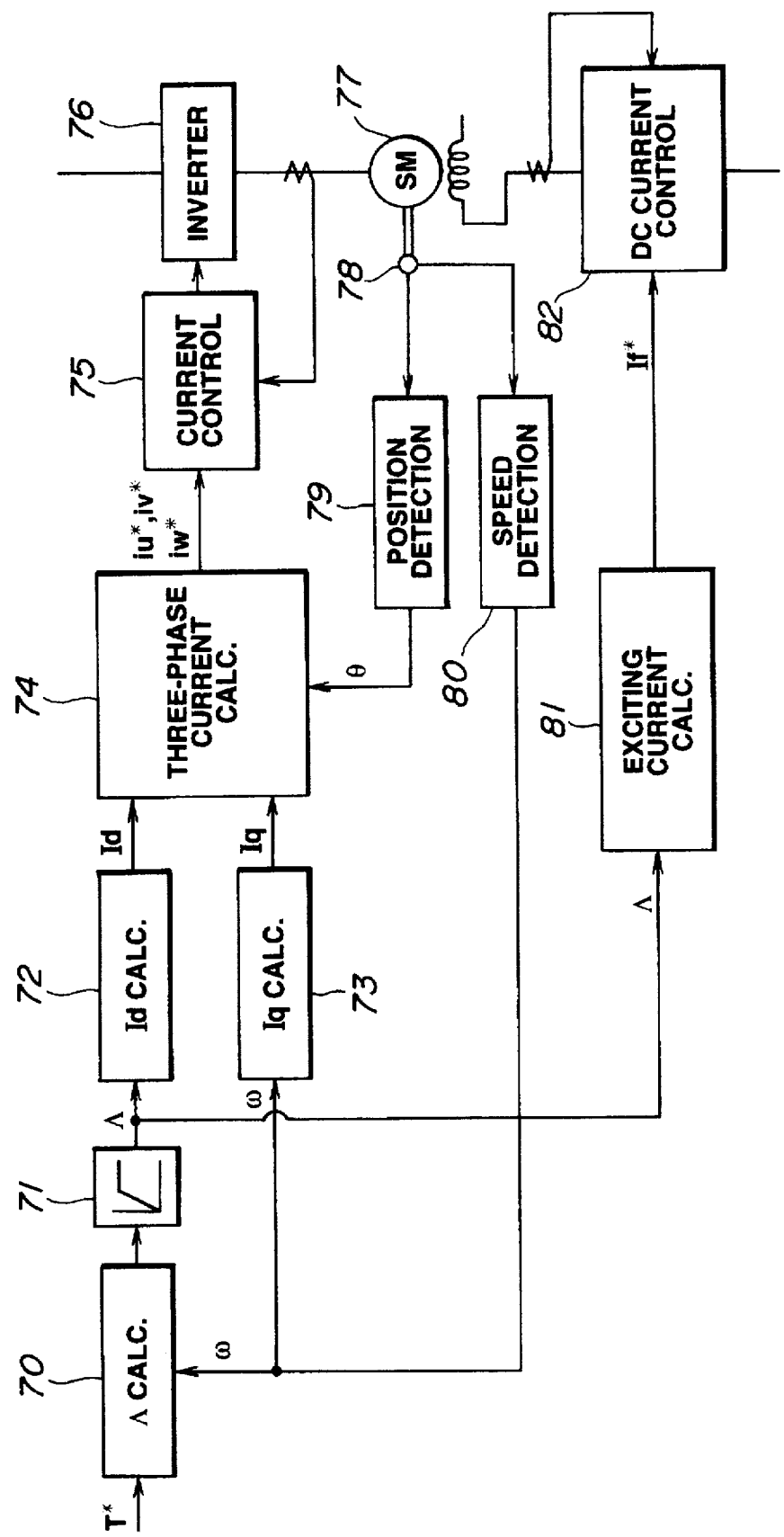
FIG. 10 is a block diagram of a third embodiment of the motor control system according to the present invention.

FIG. 10 shows a block diagram of the above-mentioned $V_q=0$ control system. As shown in FIG. 10, a $\Lambda$ calculator 70 executes the calculation of $\Lambda$ represented by the equation (15) upon receiving the torque command T* and the speed command $\omega$*. Then, limiter 71 limits $\Lambda$ within $\Lambda_{max}$. $I_d$-calculator 72 executes the calculation of $I_d$ from the equation (13), and $I_q$-calculator 73 executes the calculation of $I_q$ from the equation (12). Following this, a three-phase current calculator 74 calculates the current values $i_u$, $i_v$ and $i_w$, and the obtained valves are used for driving the inverter 76 through the current control section 75.

The detected value by the rotation speed detector 78 for the motor 77 is modulated as a rotational position at a position detecting section 79 and inputted to a three-phase current calculator 74. Further, the detected value by the rotation speed detector 78 is inputted to a speed detecting section 80 where the speed ω is outputted. The outputted speed ω is fed-back to the Λ calculator 70 and the $I_q$ calculator 73.

The output Λ of the limiter 71 is inputted to the $I_d$ calculator 72 and the exciting current calculator 81 for obtaining the current $i_f$. A DC electric current control circuit 82 is controlled according to $I_d$ and $i_f$.

Although FIG. 10 shows a torque control circuit, by adding the speed feedback and the torque calculator 62 shown in a left side portion divided by the broken line in FIG. 9, the control circuit of FIG. 10 can be used as a speed control circuit.

Accordingly, by suppressing $V_{max}$ so as to implement $V_q=0$ control, the terminal voltage V is decided. This control becomes suitable for the heavy-loading and high-speed range control.

Wide-range speed control

In order to smoothly implement a wide-range speed control, it is necessary to interconnect the $I_d$-$I_q$ ratio-constant control and the $V_q=0$ control. Although it is possible to properly select the value K ($I_d$-$I_q$ ratio), it is necessary to select the value K so as to avoid discontinuous of the electric current and the magnetic flux at a transient between the $I_d$-$I_q$ ratio-constant control and the $V_q=0$ control.

During the $V_q=0$ control, $I_q=V_{max}/\omega L_q$, $I_d=1L/L_d$ is obtained from the equations (12) and (13). When the control is changed between the $I_d$-$I_q$ ratio-constant control and the $V_q=0$ control, $I_d=KI_q$. Accordingly, the following equation (17) is obtained.

$$KI_q = -\Lambda/L_d \quad (17)$$

By substituting the equation (17) to the above-mentioned equation $I_q=V_{max}/\omega L_q$, the following equation (18) is obtained.

$$K \cdot (V_{max}/\omega L_q) = -\Lambda/L_d \quad (18)$$

Further the following equation (19) is obtained from the equation (18).

$$K = -(L_q/L_d) \cdot (\omega \Lambda/V_{max}) \quad (19)$$

Figure 11:
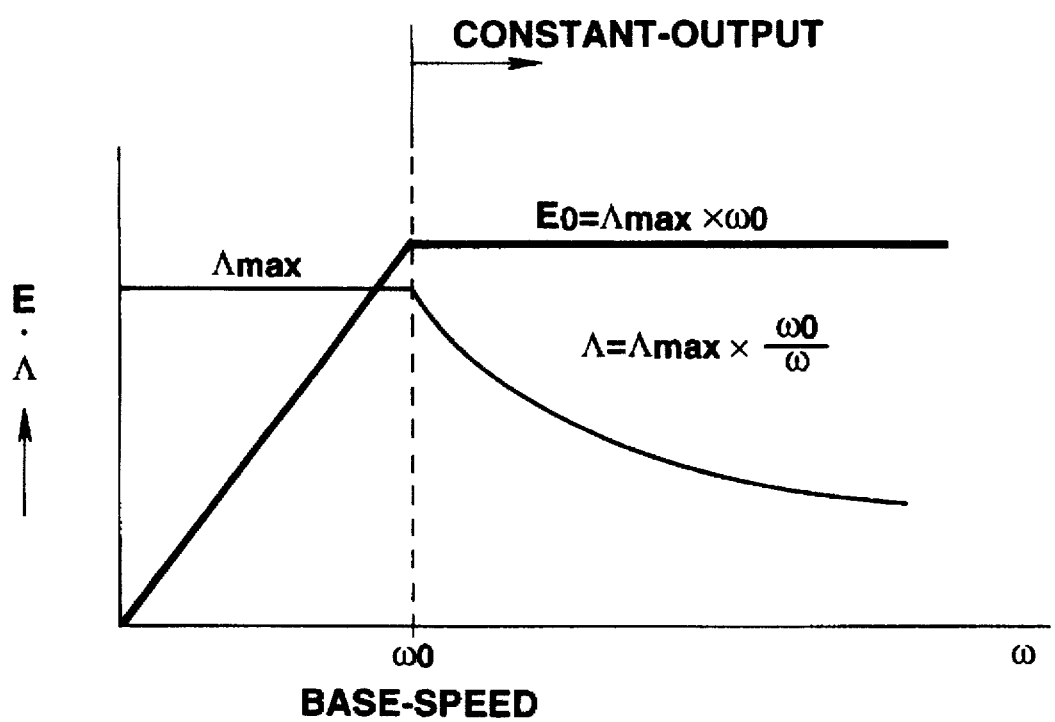
FIG. 11 is a characteristic curve between $\Lambda$ and $\omega$ for the system FIG. 10.

Although the speed ω is variable in the equation (19), in the output-constant operation range during the $I_d$-$I_q$ ratio constant control, Λω is kept at a constant value $E_0$ and therefore the induced voltage becomes constant, as shown in FIG. 11. As a result, if the motor is designed so that the switching of the control method is implemented within the constant-output operation range, the value K can be defined by the following equation (20):

$$K = -(L_q/L_d) \cdot (E_0/V_{max}) \quad (20)$$

Accordingly, it becomes possible to implement the K constant control within the constant-output operation range, and therefore the switching between the controls may be implemented when the speed of the motor is higher than the base-speed. That is, the switching from the $I_d$-$I_q$ ratio constant control to the $V_q=0$ control may be implemented when $I_q \geq V_{max}/\omega L_q$ is satisfied.

When the motor is controlled such that $I_d$ and $I_q$ satisfy the equations (13) and (17), the following equations (21) and (22) are obtained:

$$T = \frac{Pole}{2} \left\{ \Lambda I_q + (L_d - L_q)\left(-\frac{\Lambda}{L_d}\right)I_q \right\} \quad (21)$$

$$= \frac{Pole}{2} \cdot \frac{L_q}{L_d} \Lambda I_q$$

$$\Lambda = \frac{2}{Pole} \cdot \frac{L_d}{L_q} \cdot \frac{T}{I_q} \quad (22)$$

Figure 12:
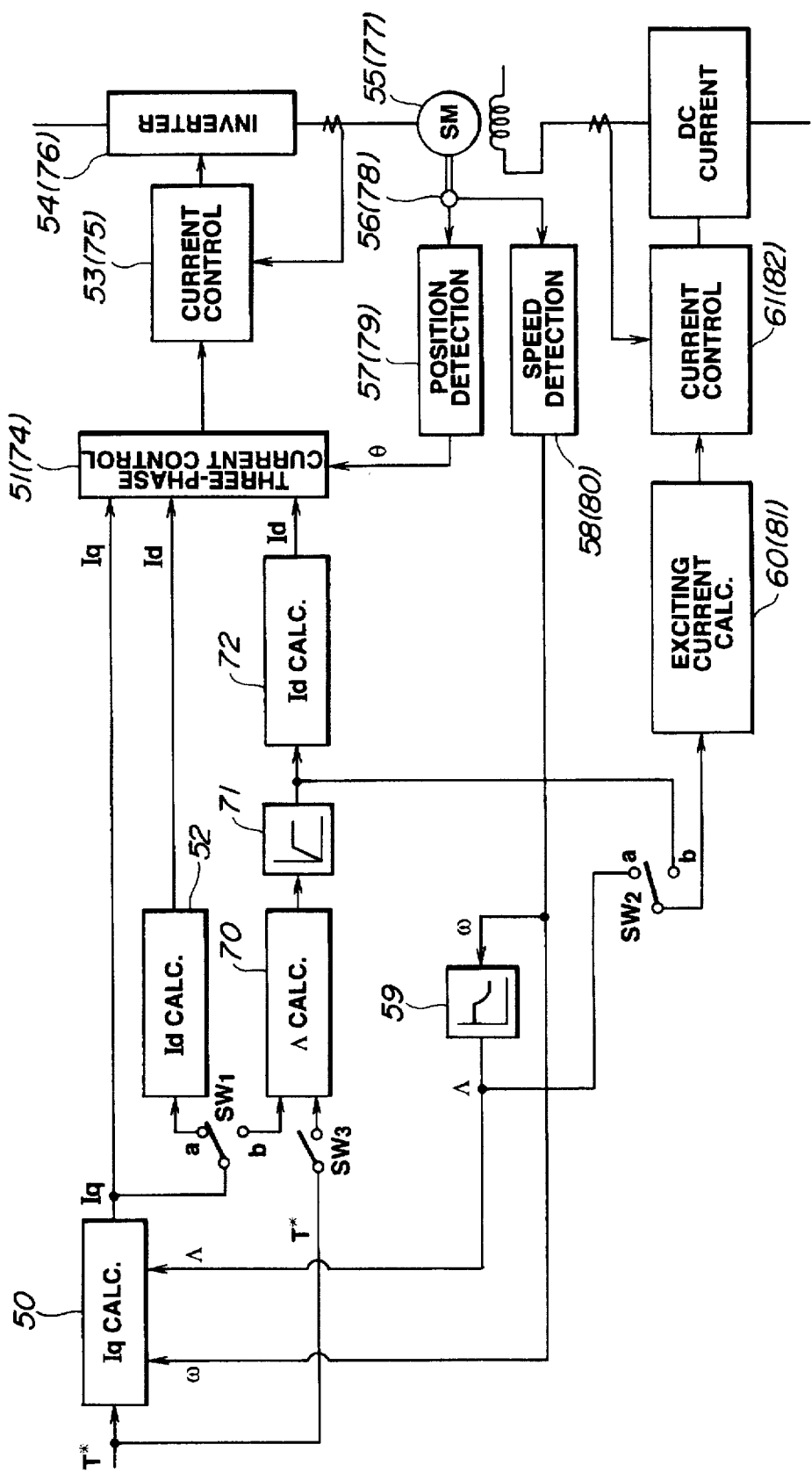
FIG. 12 is a block diagram of a fourth embodiment of the motor control system according to the present invention.

By compounding the control systems of FIGS. 8 and 10 in consideration with the equations (21) and (22), the control system of FIG. 12 is obtained. In FIG. 12, the switching between the $I_d$-$I_q$ ratio constant control and the $V_q=0$ control is implemented by the switching of switches $SW_1$, $SW_2$, and $SW_3$. When the $I_q$ calculator 50 calculates the following equation (23) is implemented, the switches $SW_1$ and $SW_2$ are connected to a-contact side, and the switch $SW_3$ is opened. On the other hand, when the $I_q$ calculator 50 calculate the following equation (24), the switches $SW_1$ and $SW_2$ are connected to b-contact side, and the switch $SW_3$ is closed.

When $I_q < \frac{V_{max}}{\omega L_q}$, $$I_q = \frac{-\Lambda + \sqrt{\Lambda^2 + 8(L_d - L_q)K \cdot \frac{T}{Pole}}}{2(L_d - L_q)K} \quad (23)$$

When $I_q \geq \frac{V_{max}}{\omega L_q}$, $$I_q = \frac{V_{max}}{\omega L_q}$$

If a speed feedback element is applied to the control system of FIG. 12, it becomes a speed control system.

Figure 13A:
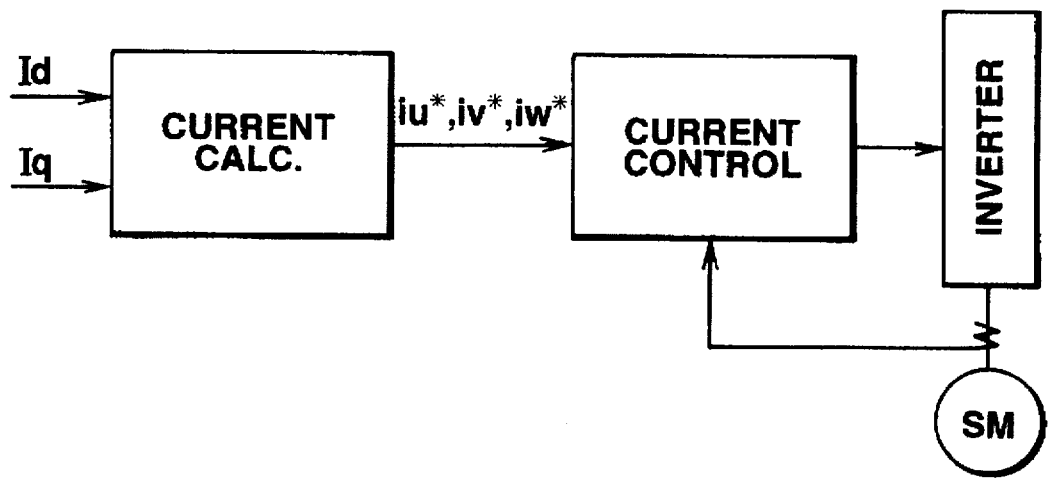
FIG. 13A a block diagram of a current control type inverter.
Figure 13B:
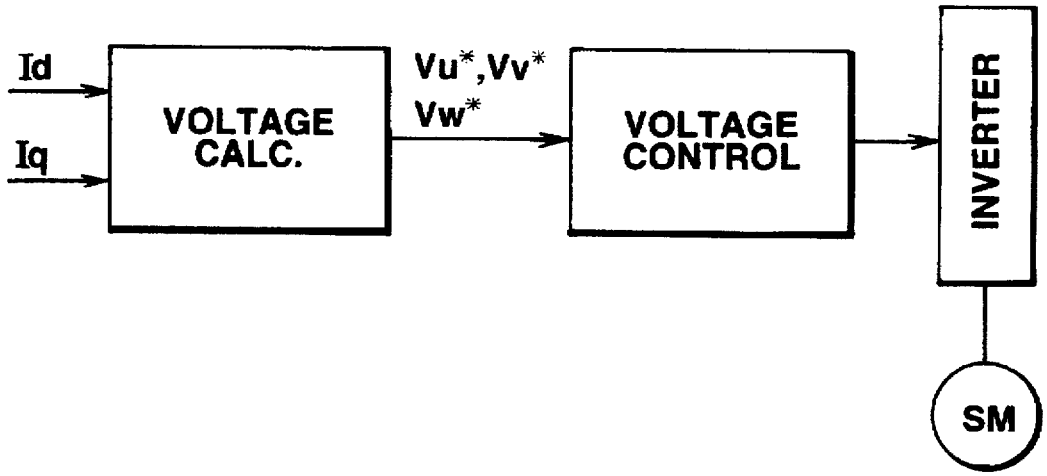
FIG. 13B is a block diagram of a voltage control type inverter.

Although the embodiments of the control system have been shown and described to comprise the inverter 34, 54, 76 of a current control type which is driven by the current control section 33, 53, 75 as shown in FIG. 13A, an inverter of a voltage control type as shown in FIG. 13B may be used in the control system since it is possible to calculate the voltage $V_d$ and $V_q$ by substituting $I_d$, $I_q$ and Λ into the equation (1).

With the above-mentioned embodiments of the motor control system according to the present invention, it is possible to extend the operable range of the PM motor which includes a DC field magnet coil. Furthermore, it is possible to form the motor to be smaller and to improve the efficiency due to the increase of the maximum torque and the raising of the maximum rotation speed. This further enables the current capacity of the electric source to be smaller.

Figure 14:
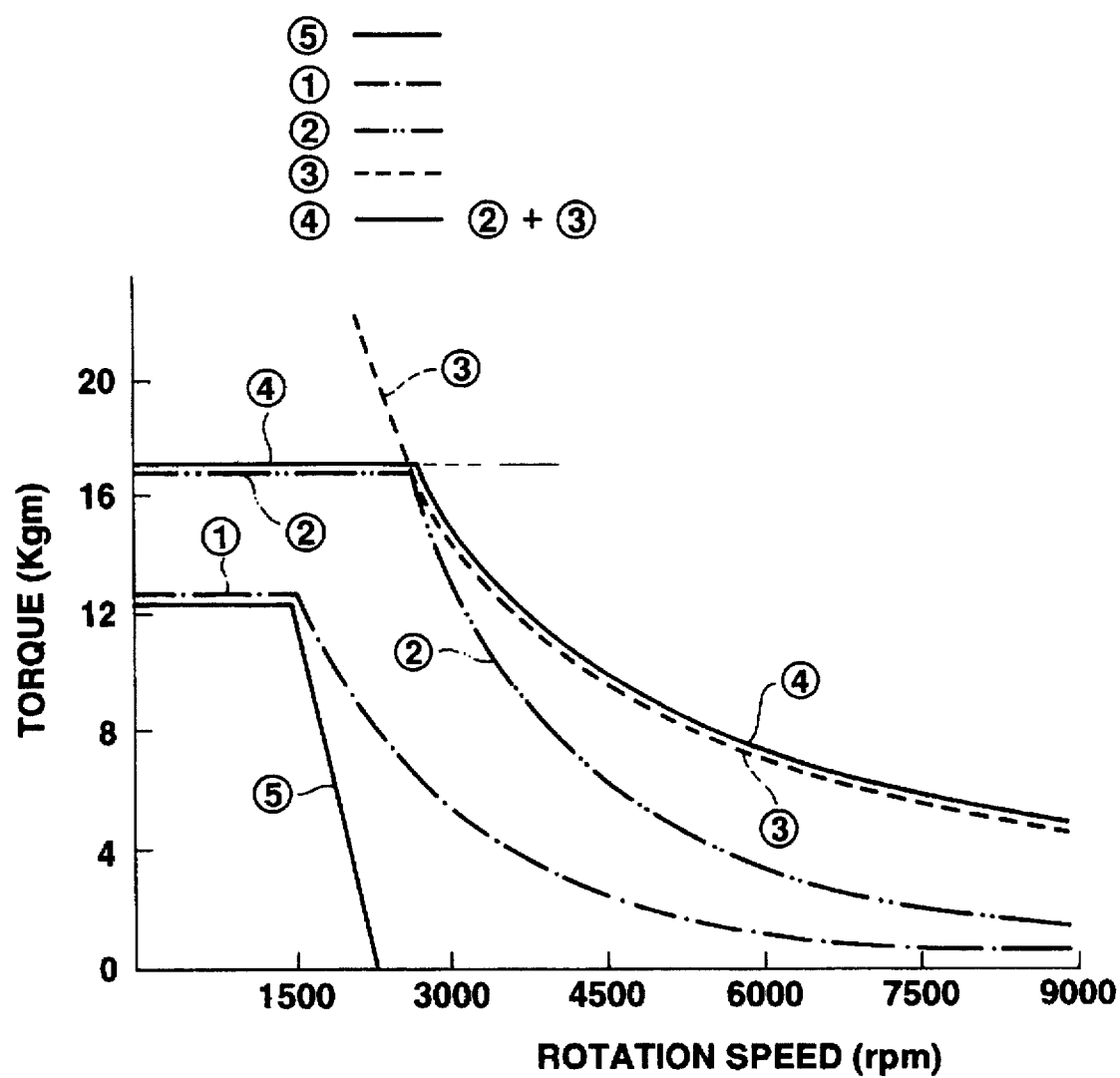
FIG. 14 is a set of characteristic curves which show differences in efficiency among the embodiments.

In concrete, the experiment by the motor of 45kW-8P 3000 rpm was implemented, and the data as shown in FIG. 14 was obtained. As is clear from the data of FIG. 14, the operable range ① of a field magnet control is extended as compared with the operable range ⑤ in case of no-field magnet control. By the Id–Iq ratio constant control, the operable range is further extended as shown by the line ②, and by the $V_q=0$ control within a constant-output range the operable range thereof is extended as shown by the line ③. Further, maximum advantage is obtained by the combination of $I_d$-$I_q$ ratio control and the $V_q=0$ control as shown by the line ④.

Hereinbefore, the control method such as a high-speed range and heavy-loading control, and a wide-range speed control of the brushless DC motor, which control method is implemented by obtaining I or V on the basis of the voltage equation, has been mentioned.

Next, another control method will be discussed hereinafter. The control method is a method for deciding the current ratio and the magnetic flux by taking account the iron loss and using previously prepared a current ration (k) table and a magnet flux ($\Lambda$) table.

Figure 15B:
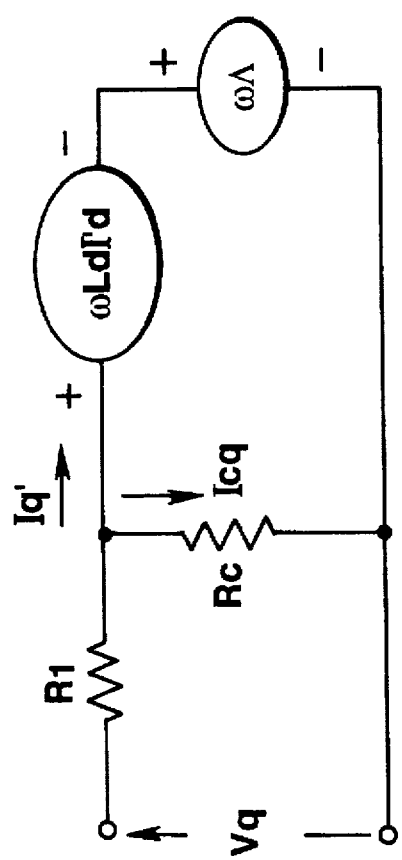
FIGS. 15A and 15B are equivalent circuits of d-axis and q-axis.
Figure 15A:
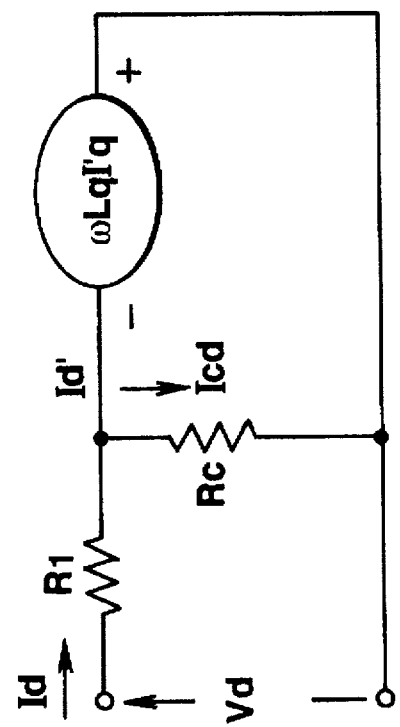

FIGS. 15A and 15B show the equivalent circuits of this control system, in which the respective circuits of the q-axis and d-axis are described and where $V_d$ is a d-axis component of an armature voltage, $V_q$ is q-axis component of an armature voltage of the q-axis, $I_d$ is a d-axis component of an armature current, $I_q$ is a q-axis component of an armature current, $R_1$ is a resistance of the armature, $R_c$ is an equivalent iron-loss resistance, $L_d$ is a d-axis inductance, $L_q$ is a q-axis inductance, $\omega$ is an angle frequency of an electric source, $\Lambda$ is an interlinkage magnetic flux of the armature coil, $I_{cd}$ and $I_{cq}$ are current iron losses, and $I_d'$ and $I_q'$ are current loading.

As is clear from FIGS. 15A and 15B, the current values $I_d$, $I_q$, $I_{cd}$ and $I_{cq}$ are obtained by the following equations (25) and (26):

$$I_d = I_d' + I_{cd}$$
$$I_q = I_q' + I_{cq} \quad (25)$$

$$I_{cd} = -\frac{\omega L_q I_q'}{R_c}$$

$$I_{cq} = \omega \frac{L_d I_d' + \Lambda}{R_c} \quad (26)$$

When $\Lambda_m$ is an interlinkage magnetic flux only by the permanent magnet, $M_f$ is a mutual inductance of a field magnet coil and an armature coil, and $I_f$ is an exciting current, the following equation (27) is obtained.

$$\Lambda = \Lambda_m + M_f I_f \quad (27)$$

The following equations (28) and (29) are obtained by providing a voltage equation of FIGS. 15A and 15B according to the equations (25) and (26).

$$\begin{bmatrix} V_d \\ V_q \end{bmatrix} = \begin{bmatrix} R_1 & -\omega k_r L_q \\ \omega k_r L_d & R_1 \end{bmatrix} \begin{bmatrix} I_d' \\ I_q' \end{bmatrix} + \begin{bmatrix} 0 \\ \omega k_r \Lambda \end{bmatrix} \quad (28)$$

$$\text{where } k_r = 1 + \frac{R_1}{R_c} \quad (29)$$

Furthermore, the equation of the torque can be represented by the following equation (30):

$$T = \frac{\text{Pole}}{2} \{\Lambda I_q' + (L_d - L_q) I_d' I_q'\} \quad (30)$$

where Pole is the number of poles.

As a result, when the hybrid excitation type permanent magnet synchronous motor is operated by the torque control, the operation is accomplished by controlling $I_d'$, $I_q'$ and $\Lambda$.

If it is defined that $I_d' = k I_q'$ - - - (31), the following equation (32) is derived from the equation (30).

$$T = \frac{\text{Pole}}{2} \{\Lambda I_q' + (L_d - L_q) k I_q'^2\}$$

$$(L_d - L_q) k I_q'^2 + \Lambda I_q' - \frac{2}{\text{Pole}} T = 0$$

$$I_q' = \frac{-\Lambda + \sqrt{\Lambda^2 + 8(L_d - L_q) k \cdot \frac{T}{\text{Pole}}}}{2(L_d - L_q) k} \quad (32)$$

As is clear from the equation (32), when the current ratio k of the d-axis component of current and the q-axis component of it and the magnetic flux $\Lambda$ relative to the proper speed $\omega$ and torque T can be obtained, it is possible to decide the current $I_q'$.

Figure 16:
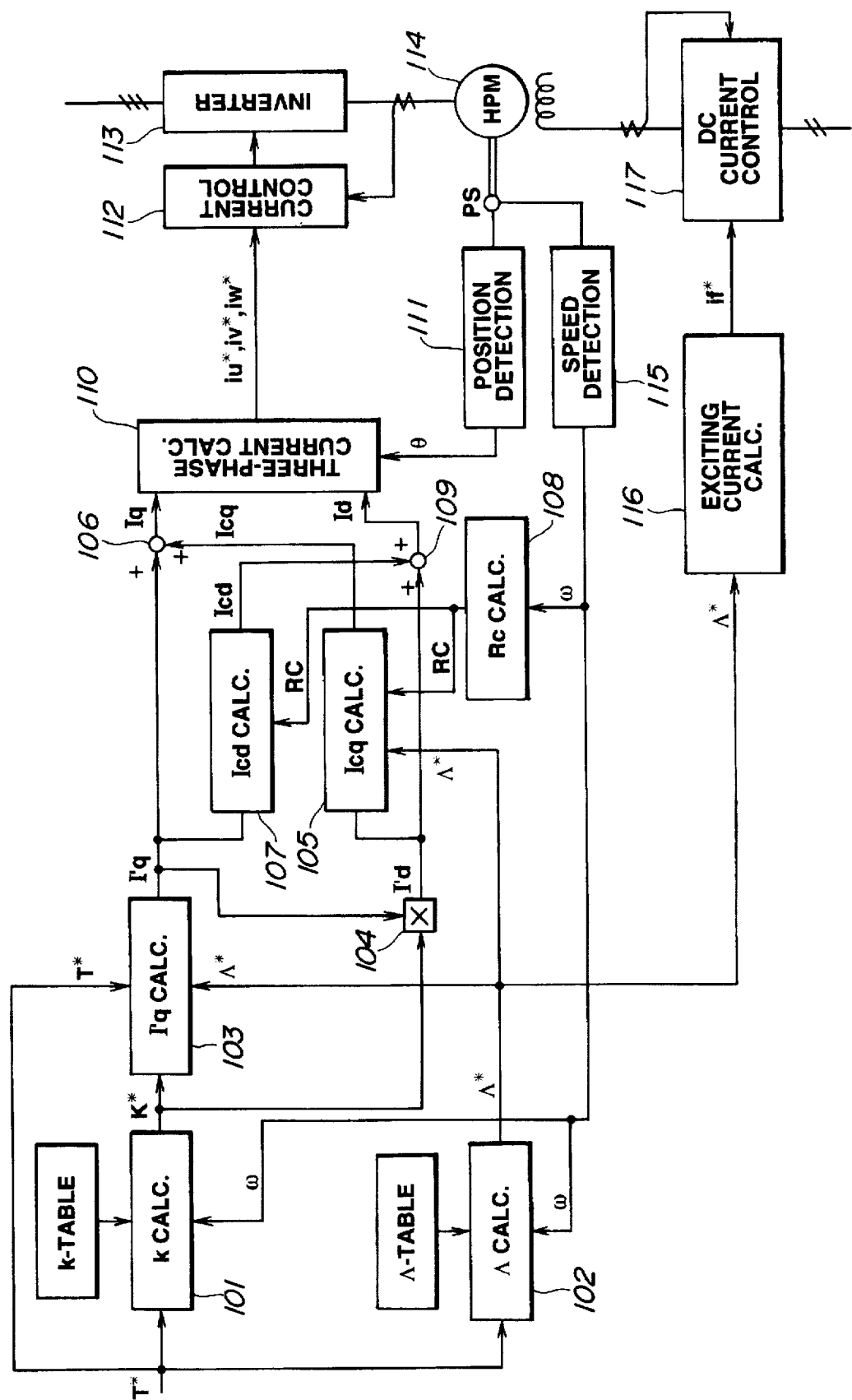
FIG. 16 is a block diagram of a HPM control system.

Hereinafter, the field magnet control method and the creating method of the control table will be discussed with reference to FIGS. 16 to 35. FIG. 16 shows a block diagram of a control system of the hybrid excitation type permanent magnet synchronous motor of a current control type. In FIG. 16, the torque command T* is inputted to the k calculating circuit 101 and a $\Lambda$ calculating circuit 102, and an appropriate values k* and $\Lambda$* corresponding to the speed $\omega$ are selected from the k-table and the $\Lambda$-table, respectively, in the circuit 101 and 102.

In a $I_q'$ calculating circuit 103, the q-axis current component $I_q'$ is obtained from k*, the torque command T* and the magnetic flux $\Lambda$*. In a multiplier 104, a d-axis current component is obtained by multiplying the current $I_q'$ and k*. In an adder 106, an output $I_q$ is obtained by adding $I_q'$ and $I_{cq}$ ($I_q' + I_{cq}$). In a $I_{cd}$ calculator 107, an iron loss current $I_{cd}$ is obtained by substituting the q-axis current component $I_q'$ and the equivalent iron loss $R_c$ into the equation (26), the output $I_d$ is obtained by adding $I_d'$ and $I_{cd}$ ($I_d' + I_{cd}$) in an addor 109. In a three-phase current calculating circuit 110, three-phase current $i_u^*$, $i_v^*$ and $i_w^*$ are obtained by substituting the outputs $I_q$ and $I_d$, and the output q into the following equations (33):

$$i_u = \sqrt{2} \ I_1 \sin(\theta + \phi)$$

$$i_v = \sqrt{2} \ I_1 \sin\left(\theta + \phi - \frac{2}{3}\pi\right) \quad (33)$$

$$i_w = \sqrt{2} \ I_1 \sin\left(\theta + \phi + \frac{2}{3}\pi\right)$$

where $\theta$ is a rotor position angle and $\tan^{-1}$ ($I_d/I_q$), and $I_1$ is $\sqrt{(I_d^2 + 30 I_q^2)/3}$.

In a current control circuit 112, the control output of the inverter 113 is obtained from the three-phase current values $i_u$, $i_v$ and $i_w$. A rotation speed detector PS of the motor 114 is connected to a position detecting circuit 111 for obtaining the output Q and a speed detecting circuit 115. The speed detecting circuit 115 output $\omega$ which is send to the k calculating circuit 101, the $\Lambda$ calculating circuit 102 and the $R_c$ calculating circuit 108. Further, the exciting current calculating circuit 116 receives an output $\Lambda$ from the $\Lambda$ calculating circuit and outputs $i_f^*$ to the DC current control circuit 117.

Figure 17:
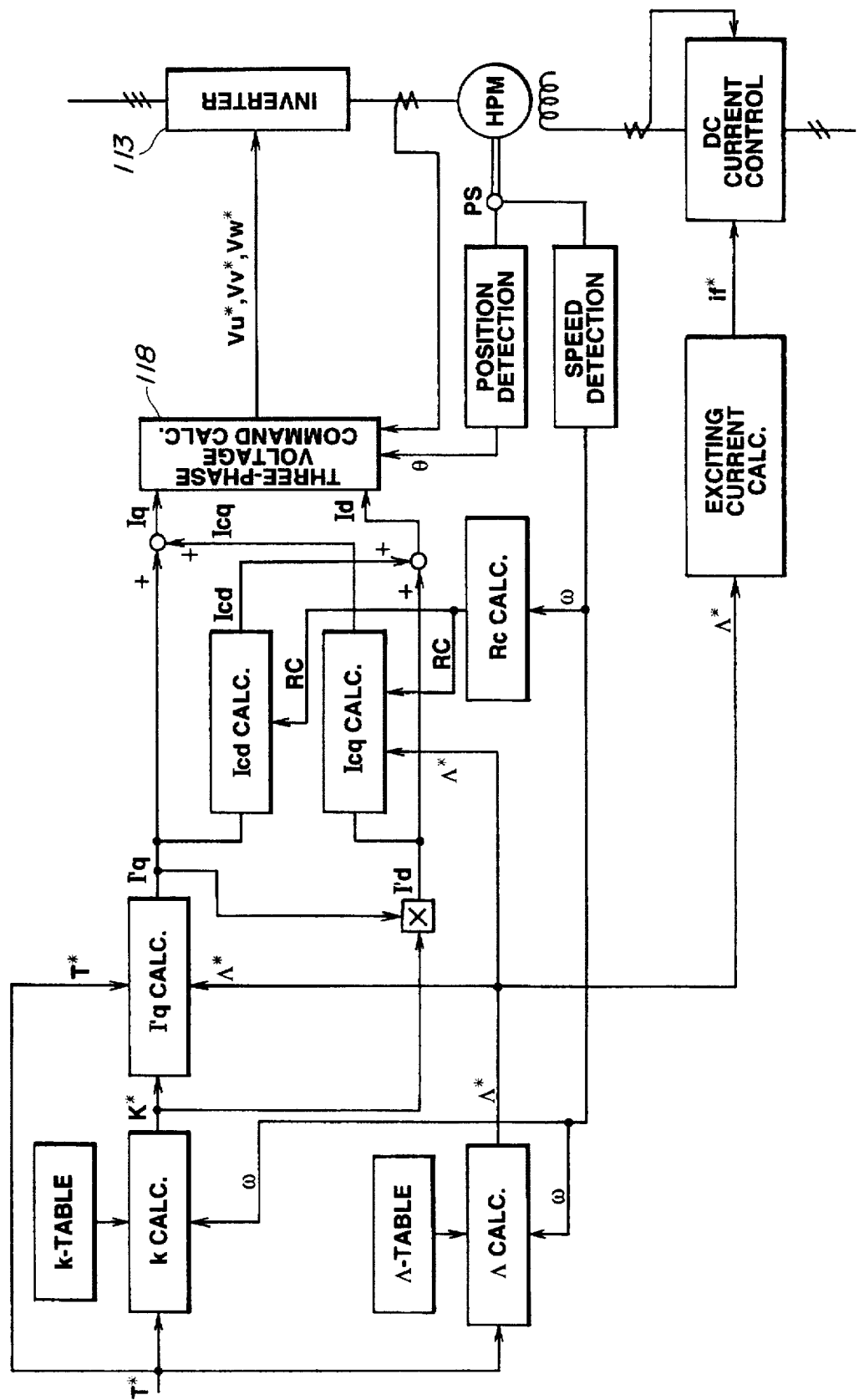
FIG. 17 is a another block diagram of a HPM control system.

FIG. 17 shows a block diagram of a motor control system of a voltage control type. The voltage control type control system is generally similar to the current control type of FIG. 16 expect that a three-phase voltage command calculating circuit 118 is used instead of the three-phase current calculating circuit 111 so as to output voltage output $V_u^*$, $V_v^*$ and $V_q^*$ to the inverter 113.

Hereinafter, the calculation of the k-table of the k calculating circuit 101 and the $\Lambda$-table of the $\Lambda$ calculating circuit 102 will be discussed with reference to FIGS. 16 and 17.

When the torque command T is commanded and the speed $\omega$ is applied to the control system, k and $\Lambda$, which satisfy the inputted torque T and speed $\omega$, infinitely exist. Accordingly, it is possible to implement the maximum torque control an the maximum efficiency control by the value k (the ratio between $I_d'$ and $I_q'$) and the magnetic flux $\Lambda$.

In case that the maximum efficiency control is implemented, the following equations (32), (26) and (25) are satisfied relative to arbitrary k and $\Lambda$.

$$I_q' = \frac{-\Lambda + \sqrt{\Lambda^2 + 8(L_d - L_q)k \cdot \frac{T}{\text{Pole}}}}{2(L_d - L_q)k} \quad (32)$$

$$I_d' = kI_q'$$

where during operation $I_q'>0$, and $k<0$ (T>0); and during regenerating $I_q'<0$, and $k>0$ (T>0).

$$I_{cd} = -\frac{\omega L_q I_q'}{R_c}$$

$$I_{cq} = \omega \frac{L_d I_d' + \Lambda}{R_c} \quad (26)$$

$$I_d = I_d' + I_{cd}$$
$$I_q = I_q' + I_{cq} \quad (25)$$

The terminal voltage $V_1$ is represented by the following equation (34) from the equation (28), and the primary voltage $I_1$ is represented by the following equation (35).

$$V_1 = \sqrt{V_d^2 - V_q^2} \quad (34)$$

$V_{max} = V_1$: where $V_{max}$ is an outputtable voltage of the inverter.

$$I_1 = \sqrt{I_d^2 - I_q^2} / \sqrt{3} \quad (35)$$

Further, the various losses of the motor are represented as follows:

| | |
|---|---|
| Inverter Loss; | $W_{INV} = k_1 I_1^2 + k_2 I_1$ |
| Motor Loss | |
| Primary Loss; | $W_{cu} = R_1(I_d^2 + I_q^2)$ |
| Iron Loss; | $W_{fe} = R_c(I_{cd}^2 + I_{cq}^2)$ |
| where | $R_c = R_{co} \cdot (f/f_0)^{0.4} \quad \ldots \quad f < f_0$ |
| | $= R_{co} \quad \ldots \quad f \geq f_0$ |
| Machine Loss; | $W_{mc} = k_0 \times n^{1.6}$ |
| Stray Loss; | $W_{st} = 0.2 W_{cu}$ |

As a result, a total loss can be represented as follows:

$$W_{total} = W_{INV} + 1.2 W_{cu} + W_{fe} + W_{mc} + W_{st}$$

Accordingly, an efficiency η is represented as follows:
(1) during driving, $$\eta = \omega_r T \times 100/(\omega_r T + W_{total})$$

(2) during regenerating, $$\eta = (\omega_r T + W_{total}) \times 100/\omega_r T$$

Therefore, by fixing the torque T and the speed ωr and varying k and Λ, it becomes possible to obtain the values of k and Λ by which the efficiency becomes maximum.

Figure 18:
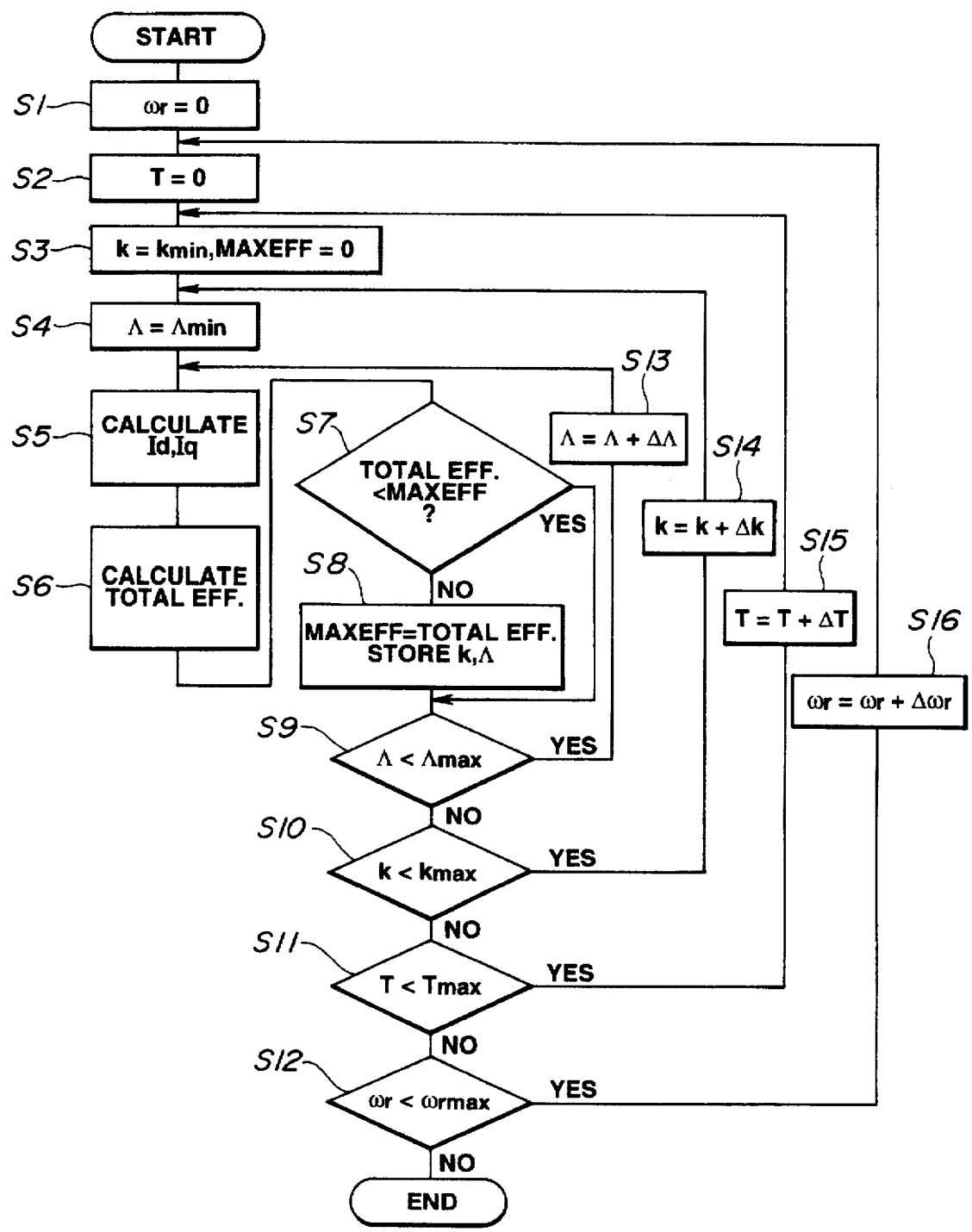
FIG. 18 is a flow chart which indicates a method for calculating k-table and $\Lambda$-table.
Figure 19:
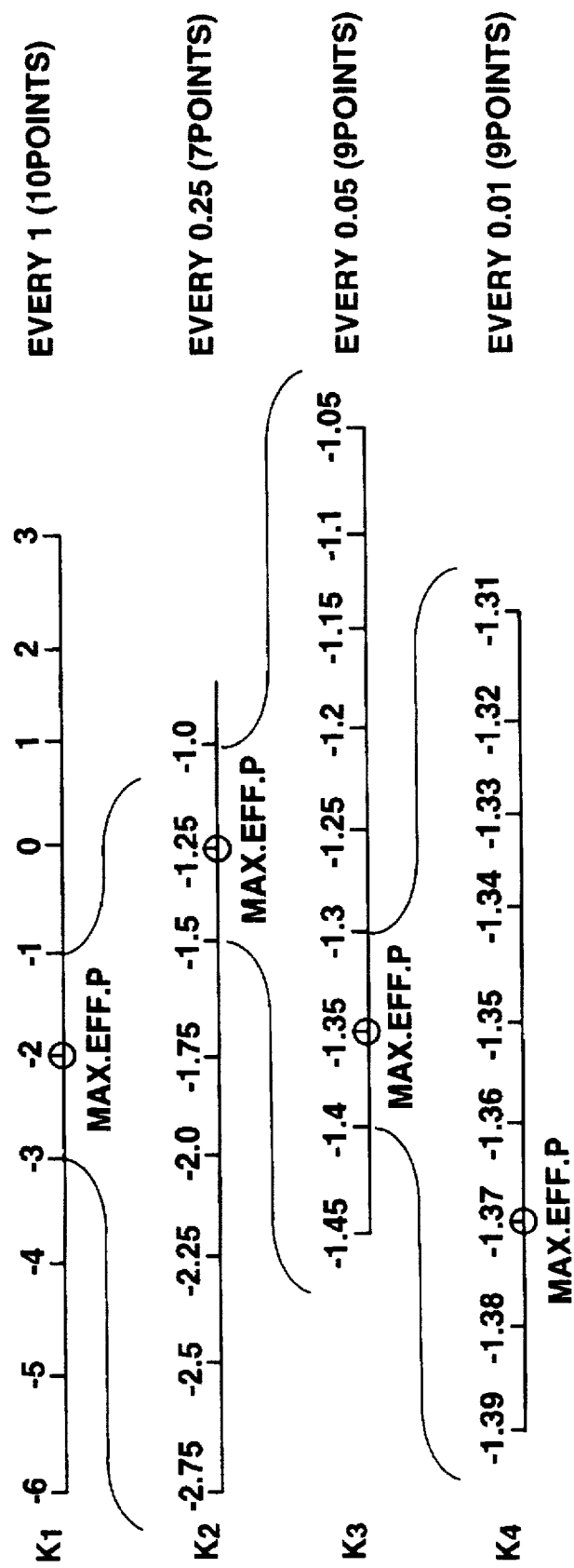
FIG. 19 is an explanatory view for the calculation of k.

The derivation of the k-table and the Λ-table is implemented according to a flow chart shown in FIG. 18.

In a step $S_1$, the speed ωr is initialized (ωr=0), in a step S2 the torque T is initialized (T=0), in a step S3 the value k is set to $k_{min}$ (k=$k_{min}$) and MAXEFF (maximum efficiency) is set at 0 (MAXEFF=0), and in a step S4 the magnetic flux Λ is set at 0.

In a step S5, on the basis of k and Λ, $I_d$ and $I_q$ are calculated. Following this, in a step S6 the total efficiency η is calculated. In a step S7, it is judged whether the total efficiency η is higher than the MAXEFF or not. When the judgement in the step S7 is "YES", the program jumps to a step S9. When the judgement in the step S7 is "NO", the program proceeds to a step S8 wherein MAXEFF=η and k and Λ are stored. In the step S9 it is judged whether Λ is smaller than $\Lambda_{max}$ or not. When the judgement in the step S9 is "YES" (Λ<$\Lambda_{max}$), the program proceeds to a step S13 wherein Λ is incremented by ΔΛ (Λ=Λ+ΔΛ), and then returns to the step S5. When the judgement in the step S9 is "NO" (Λ≥$\Lambda_{max}$), the program proceeds to a step S10 wherein it is judged whether k is smaller than $k_{max}$ or not. When the judgement in the step S10 is "YES" (k<$k_{max}$), the program proceeds to a step S14 wherein k is incremented by Δk (k=k+Δk) and returns to the step S4. When the judgement in the step S10 is "NO", the program proceeds to a step S11 wherein it is judged whether T is smaller than $T_{max}$ or not. When the judgement in the step S11 is "YES" (T<$T_{max}$), the program proceeds to a step S15 wherein T is incremented by DT (T=T+ΔT), and returns to the step S3. When the judgment in the step S11 is "NO", the program proceeds to a step S12 wherein it is judged whether ωr is smaller than $\omega r_{max}$ or not. When the judgement in the step S12 is "YES", the program proceeds to a step S16 wherein ωr is incremented by Δω, (ωr=ωr+Δωr), and then returns to the step S2. When the judgement in the step S12 is "NO", the program proceeds to END.

In this flow chart, if ΔΛ and Δk is too small, the amount of the points to be calculated becomes too large. Accordingly, the ΔΛ and Δ102 are decreased step by step.

For example, when the hybrid excitation type permanent magnet synchronous motor of 45 kw is operated by varying the speed ωr and the torque T from 0 to maximum, respectively, ωr and the torque T is varied as follows:

$0 \leq \omega r \leq 9000$ (rpm) Δωr = 1000 (rpm) 10 steps
$0 \leq T \leq 20$ (kg m) ΔT = 2 (kg m) 11 steps At the 110 (10×11) points of the operating points, the efficiency is calculated by varying k and Λ as follows:

$-6 \leq k \leq 3$ Δk = 0.01
$0.3 \Lambda_{max} \leq \Lambda \leq \Lambda max$ ΔΛ = 0.01 $\Lambda_{max}$.

Figure 20:
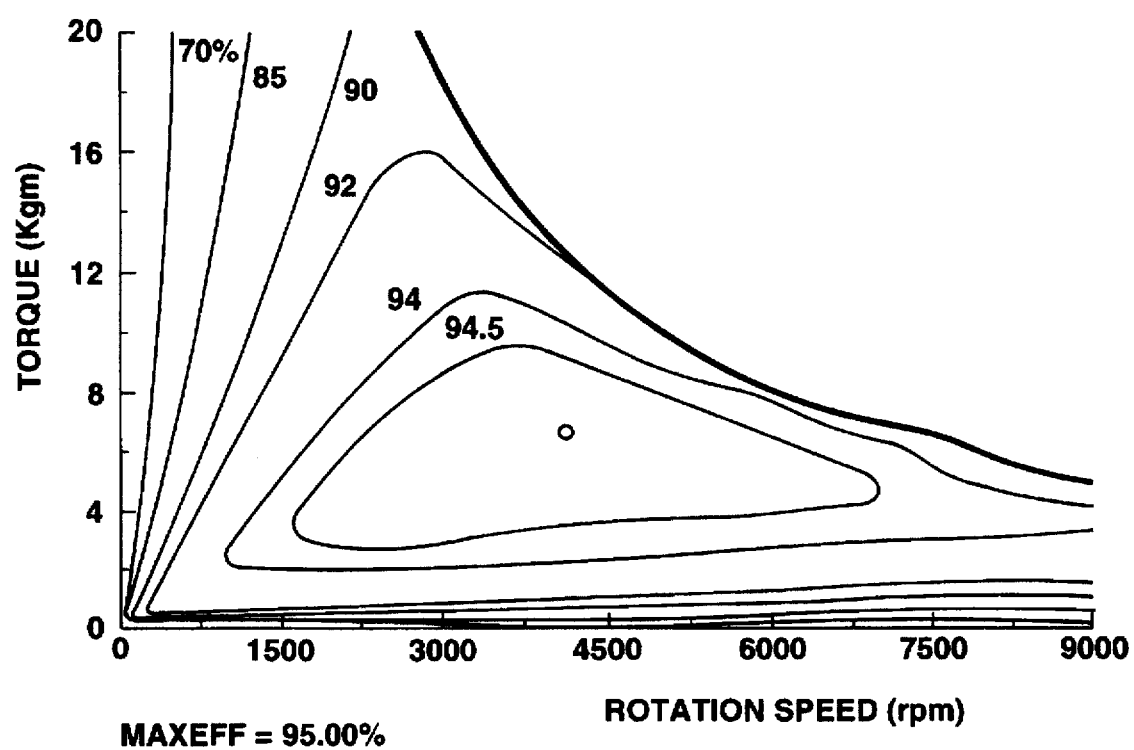
FIG. 20 is an efficiency map of a motor which is obtained by a simulation.

The varying of k is implemented as shown in FIG. 20, that is, first Δk=1 (10 points), next Δk=0.25 (7 points), third Δk=0.05 (9 points), and then Δk=0.01 (9 points). Accordingly, Λ may be varied from 0.3 $\Lambda_{max}$ to $\Lambda_{max}$ relative to the 35 points of k.

The simulation data of the coefficient k and ΔΛ of the hybrid excitation type permanent magnet synchronous motor is shown as follows:

45 kw-8P-3000 rpm
$R_1$=0.01582 (Ω)
$L_d$=0.299 (mH) $L_q$=0.192 (mH)
$L_0$=0.186
Inverter loss coefficient
$k_1$=0.0156/2 $k_2$=9.02/2

The k-table and Λ-table were obtained as shown in the following Tables 1 and 2.

TABLE 1 k-TABLE

| T | $\omega_r$ | | | | | | | | | (rpm) |
|---|---|---|---|---|---|---|---|---|---|---|
| | 0 | 1000 | 2000 | 3000 | 4000 | 5000 | 6000 | 7000 | 8000 | 9000 |
| Torque (kg · m) | | | | | | | | | | |
| 0 | 0.00 | 0.00 | 0.00 | 0.00 | 0.00 | 0.00 | 0.00 | 0.00 | 0.00 | 0.00 |
| 2 | 0.06 | −0.02 | −0.14 | −0.20 | −0.28 | −0.35 | −0.43 | −0.52 | −0.60 | −0.68 |
| 4 | 0.11 | 0.06 | −0.05 | −0.20 | −0.30 | −0.38 | −0.54 | −0.70 | −0.95 | −1.28 |
| 6 | 0.17 | 0.12 | 0.04 | −0.06 | −0.24 | −0.55 | −0.75 | −1.02 | −1.30 | −1.60 |
| 8 | 0.21 | 0.18 | 0.11 | 0.03 | −0.26 | −0.57 | −0.77 | −1.05 | −1.38 | −1.90 |
| 10 | 0.26 | 0.23 | 0.17 | 0.10 | −0.30 | −0.66 | −0.85 | −1.15 | 0 | 0 |
| 12 | 0.30 | 0.27 | 0.22 | 0.09 | −0.38 | −0.80 | 0 | 0 | 0 | 0 |
| 14 | 0.33 | 0.30 | 0.26 | 0.01 | −0.50 | −0.95 | 0 | 0 | 0 | 0 |
| 16 | 0.36 | 0.34 | 0.30 | −0.09 | −0.65 | 0 | 0 | 0 | 0 | 0 |
| 18 | 0.39 | 0.36 | 0.33 | −0.17 | −0.74 | 0 | 0 | 0 | 0 | 0 |
| 20 | 0.41 | 0.39 | 0.35 | −0.25 | 0 | 0 | 0 | 0 | 0 | 0 |

TABLE 2

Λ-TABLE

| T | $\omega_r$ | | | | | | | | | (rpm) |
|---|---|---|---|---|---|---|---|---|---|---|
| | 0 | 1000 | 2000 | 3000 | 4000 | 5000 | 6000 | 7000 | 8000 | 9000 |
| Torque (kg · m) | | | | | | | | | | |
| 0 | 0.98 | 0.30 | 0.30 | 0.30 | 0.30 | 0.30 | 0.30 | 0.30 | 0.30 | 0.30 |
| 2 | 1 | 1 | 0.90 | 0.75 | 0.66 | 0.61 | 0.58 | 0.57 | 0.56 | 0.56 |
| 4 | 1 | 1 | 1 | 1 | 0.92 | 0.85 | 0.80 | 0.78 | 0.82 | 0.90 |
| 6 | 1 | 1 | 1 | 1 | 1 | 0.97 | 0.95 | 1 | 1 | 1 |
| 8 | 1 | 1 | 1 | 1 | 1 | 1 | 1 | 1 | 1 | 1 |
| 10 | 1 | 1 | 1 | 1 | 1 | 1 | 1 | 1 | 1 | 1 |
| 12 | 1 | 1 | 1 | 1 | 1 | 1 | 1 | 1 | 1 | 1 |
| 14 | 1 | 1 | 1 | 1 | 1 | 1 | 1 | 1 | 1 | 1 |
| 16 | 1 | 1 | 1 | 1 | 1 | 1 | 1 | 1 | 1 | 1 |
| 18 | 1 | 1 | 1 | 1 | 1 | 1 | 1 | 1 | 1 | 1 |
| 20 | 1 | 1 | 1 | 1 | 1 | 1 | 1 | 1 | 1 | 1 |

As a result, the efficiency of the motor was obtained as shown in a map of FIG. 20, and the MAXEFF was 95% (MAXEFF=95%).

Although the maximum efficiency operation as mentioned above is implemented by making the k-table and the Λ-table, such a table making complicates the calculation thereof in the practical control system. Accordingly, in order to shorten the time for the calculation, the exciting current $I_d$, the torque current $I_q$ and the magnetic flux Λ, by which the maximum efficiency is obtained relative to the arbitrary operating points, are made into a table. In this case, the algorithm for making tables of $I_d$ and $I_q$ is the same as that of the k-table and the Λ-table. That is, $I_d$ and $I_q$ obtained from k and Λ are made into a table, and the Λ-table which is the same as that of the previous case is used. Since the command current is directly made into table, it is necessary to make the table by using small steps.

For example, assuming that the parameter of the motor is the same as that of the previous case, the rotation speed ωr and the torque T are varied as follows:

0≦ωr≦10400 (rpm) Δωr=81.25 rpm (128 steps)
0≦T 165 (N, m) ΔT=10.33 N, m (16 steps)

Since such steps are calculated by a CPU, the number of steps is $2^X$ (X is natural number). The k-table and Λ-table are obtained within the following range.

−6≦k≦3
0.3 $\Lambda_{max}$≦Λ≦$\Lambda_{max}$

Accordingly, the number of $I_d$, $I_q$, Λ data becomes 2193 ((128+1)×(16+1)=2193). The data is interpolated.

Figure 21:
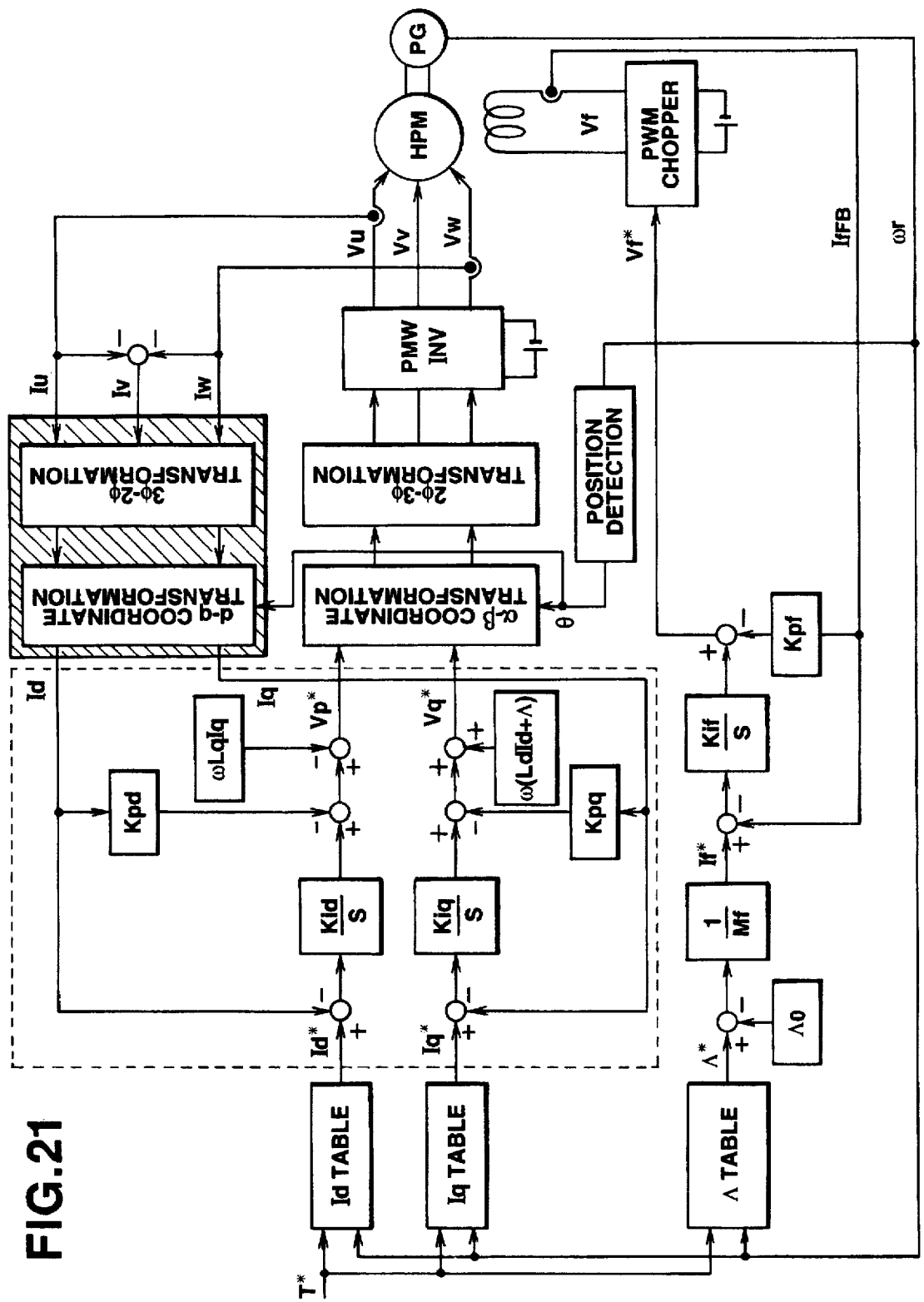
FIG. 21 is a block diagram of a practical system.

FIG. 21 shows a block diagram of the maximum efficiency control system which is practically used. The commands $I_d^*$, $I_q^*$ and Λ* are outputted from the $I_d$-table, $I_q$-table and Λ-table. $V_d^*$ and $V_q^*$ are obtained therefrom and pass through a d-axis-q-axis coordinate transformation section and a 2φ-3φ transformation section, and are used for the control of a PWM inverter, that is, the armature voltage. The command Λ* is transformed into $V_f^*$ and is used for the field magnet control at a PWM chopper.

A counterplan for disturbance is included in the control system shown in FIG. 21. That is, an enclosed area by a broken line in FIG. 21, which is disposed between the command $I_d^*$, $I_q^*$ and the coordinate transformation (α-β transformation), includes an integral element (I element), $K_{Id}/S$, $K_{Iq}/S$, an adding proportion element (P element), $K_{Pd}$, $K_{Pq}$ and adding elements $\omega L_q I_q$, $\omega(L_d I_d+\Lambda)$. The integral element and the proportion element are provided for compensating a transient term and a normal term in the previous voltage equation and integral and adding in a feedback system. The adding element indicates an interference term and a compensation in a feed-forward system.

The disturbance in the equivalent circuit and the voltage equation will be discussed hereinafter. That is, $I_q$, $I_d$ and $\Lambda$ are previously made into tables as shown in FIG. 21 for obtaining maximum efficiency of k-table and $\Lambda$-table, and the current control is independently implemented on the respective d-axis and q-axis, in actual case. Accordingly, the disturbance is generated in the respective axes and degrades the performance of the control. In FIG. 22, taking into consideration with the iron loss of a typical disturbance, a voltage equation for an equivalent circuit of FIG. 22 including a transient condition is obtained as follows:

$$\begin{bmatrix} V_d \\ V_q \end{bmatrix} = \begin{bmatrix} R_1 + L_{dp} & -\omega k_r L_q \\ \omega k_r L_d & R_1 + L_{qp} \end{bmatrix} \begin{bmatrix} I_d' \\ I_q' \end{bmatrix} + \begin{bmatrix} 0 \\ \omega k_r \Lambda_m \end{bmatrix} + \begin{bmatrix} 0 \\ \omega k_r M_f I_f \end{bmatrix} \quad (36)$$

where $R_1$ is an armature resistance; $R_c$ is a equivalent iron-loss resistance; $L_d$ is a d-axis inductance; $L_q$ is a q-axis inductance; $\Lambda$ is an interlinkage magnetic flux of the armature coil; w is an electric source angle frequency; $V_d$ is a d-axis component of the armature voltage; $V_q$ is a q-axis component of the armature voltage; $I_d$ is a d-axis component of the armature current; $I_q$ is a q-axis component of the armature current; P is a deferential operator; and $k_1$ is $1+R_1/R_c$.

Figure 22B:
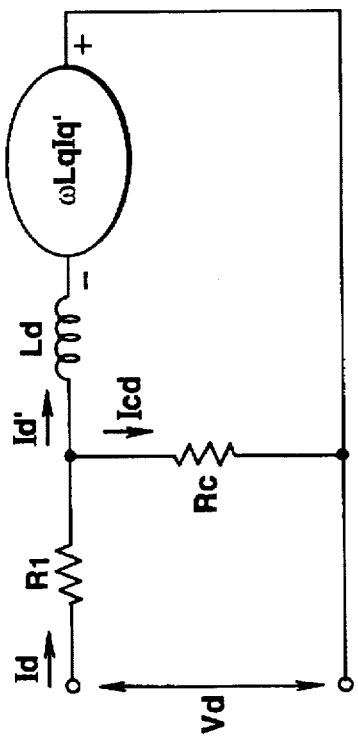
FIGS. 22A and 22B are equivalent circuits including a transient condition.
Figure 22A:
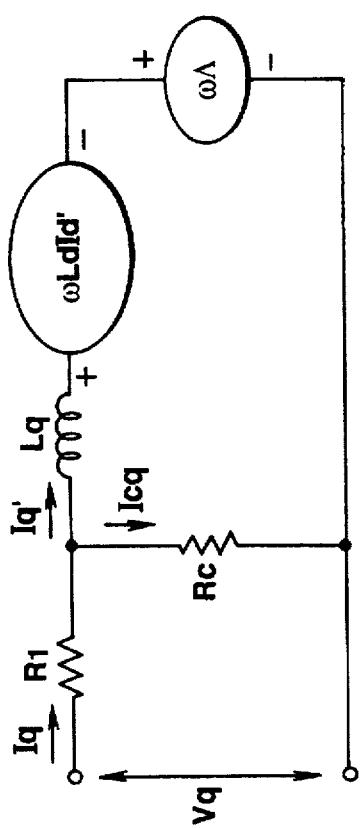

Furthermore, $I_d$, $I_q$, $I_{cd}$ and $I_{cq}$ in FIGS. 22A and 22B are represented by the equations (25) and (26), and $\Lambda = \Lambda m + M_f I_f$. As a result, from the voltage equation (36) and the equivalent circuits of FIGS. 22A and 22B, a feedback of $I_d'$ and $I_q'$ may be implemented for the control of $V_d$ and $V_q$. Although in the control system of FIG. 21 a feedback of $I_d$ and $I_q$ is implemented from the output $V_u$ and $V_w$ of the PWM inverter, in order to obtain $I_d'$ and $I_q'$ from which iron-loss current has already eliminated, it is necessary to implement further transformation. That is, since only $I_d$ and $I_q$ are obtained from the coordinate transformation, it is necessary to implement the transformation represented by the following equation.

$$\begin{bmatrix} I_d \\ I_q \end{bmatrix} = \frac{1}{R_c} \begin{bmatrix} R_c & -\omega L_q \\ \omega L_d & R_c \end{bmatrix} \begin{bmatrix} I_d' \\ I_q' \end{bmatrix} + \frac{1}{R_c} \begin{bmatrix} 0 \\ \omega \Lambda \end{bmatrix}$$

$$\begin{bmatrix} I_d' \\ I_q' \end{bmatrix} = \frac{1}{R_c^2 + \omega^2 L_d L_q} \begin{bmatrix} R_c & \omega L_q \\ -\omega L_d & R_c \end{bmatrix} \begin{bmatrix} I_d \\ I_q \end{bmatrix} - \quad (37)$$

$$\frac{1}{R_c^2 + \omega^2 L_d L_q} \begin{bmatrix} R_c & -\omega L_q \\ \omega L_d & R_c \end{bmatrix} \begin{bmatrix} 0 \\ \omega(\Lambda_m + M_f I_f) \end{bmatrix}$$

Figure 23:
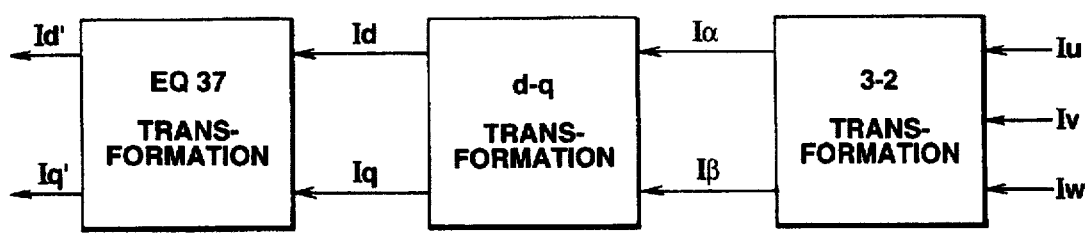
FIG. 23 is a modification of a control section of FIG. 21.

FIG. 23 shows a feedback system of a modulation of a feedback system shown by a hatching in FIG. 21 upon taking into consideration with the equation (37). That is, d'-q' transformation represented by the equation (37) is implemented after the 3φ-2φ transformation and the d-q transformation. An area enclosed by a broken line shows a non-interference IP control system which eliminates iron-loss.

In the voltage equation (36) and the equivalent circuits of FIGS. 22A and 22B, a disturbance, which can not be controlled independently in d-axis and q-axis, that is, an interference term, is $K_r(\Lambda_m + M_f I_f)$ at the d-axis which is of an induced voltage due to the q-axis inductance and the d-axis inductance and $\omega k L_d I_q'$ and $\omega Kr(\Lambda_m + M_f I_f)$ at the q-axis which is of an induced voltage generated by the change of the magnetic flux by the DC field magnet current of q-axis. Therefore, a feed-forward compensation is implemented relative to d-axis and q-axis as a control for eliminating the disturbance. That is, a feed-forward compensation of $\omega(L_d I_q + \Lambda)$ shown in FIG. 21 is implemented.

Hereinafter, a current control section for a feed-forward compensation and a feed-forward system will be discussed.

Figure 24:
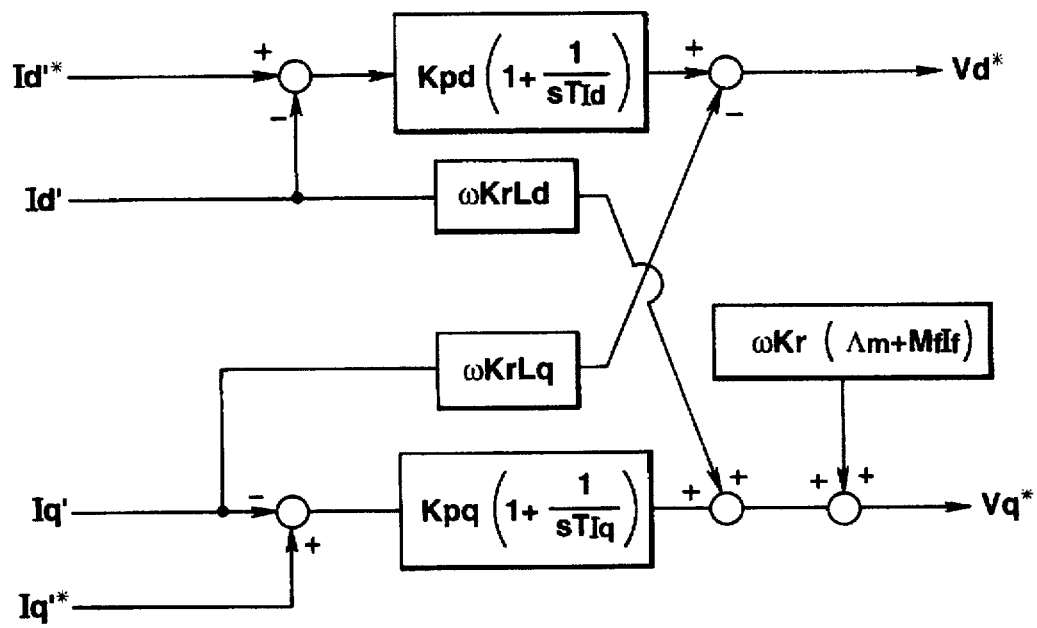
FIG. 24 is a block diagram of a non-interference PI control.
Figure 25:
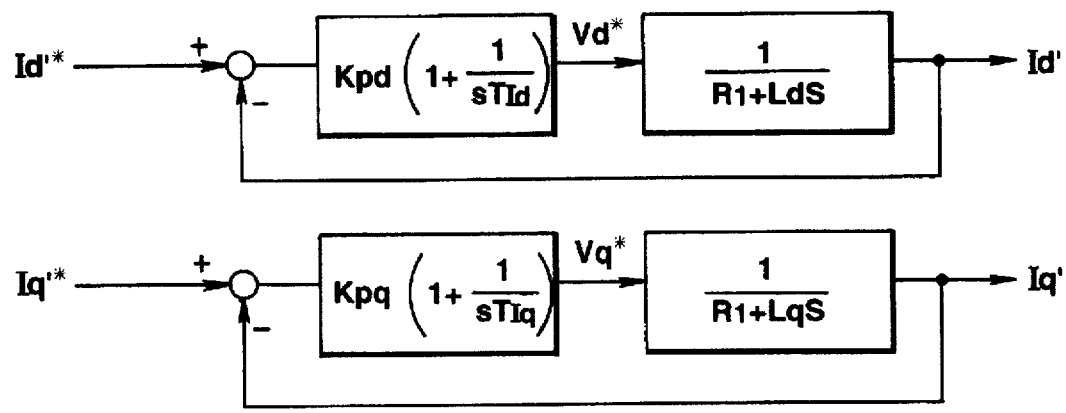
FIG. 25 is a block diagram of the d-axis and q-axis of FIG. 24.

FIGS. 24 and 25 show an example of a non-interference processing by a feed-forward compensation, which is of a proportion-integral (PI) control system. A current control section between the table command and α-β transformation includes a proportion integral element $K_{pd}(1+1/ST_{Id}) \cdot K_{pd}(1+1/ST_{Iq})$, and feed-forward compensation elements $\omega K_r L_d$, $\omega K \rho K_q$ and $\omega K_r(\Lambda_m + M_f I_f)$. Command values $I_d^*$ and $I_q^*$, and feedback values $I_d'$ and $I_q'$ are inputted thereto and the command values $V_d^*$ and $V_q^*$ are outputted therefrom upon eliminating the disturbance. Accordingly, with this non-interference processing, d-axis and q-axis are independently separated as shown in FIG. 25, and therefore the performance of the control is improved.

In this case, if the proportion gain of d-axis is $K_{pd}=\omega cL_{pd}/2\pi$ and an integral time constant is $T_{Id}=L_d/R$, a transfer function for $I_d'$ and $I_d^{*'}$ are represented by the following equation (38).

$$\frac{I_d'}{I_d^{*'}} = \frac{I_q'}{I_q^{*'}} = \frac{1}{1 + \frac{2\pi \cdot S}{\omega_c}} \quad (38)$$

Accordingly, a response characteristic is determined by the characteristic angle frequency ωc. Similarly, the same relationship as to the q-axis is obtained by assuming that $K_{pd}=\omega cL_{pd}/2\pi$ and $T_{Id}=L_d/R_1$.

Figure 26:
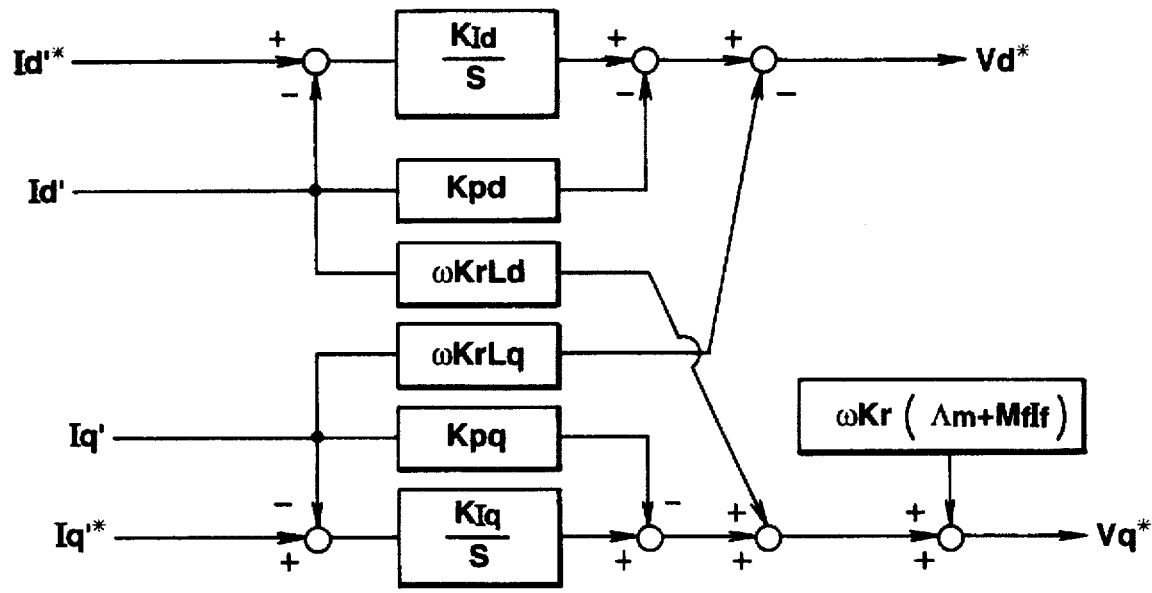
FIG. 26 is a block diagram of a non-interference IP control.
Figure 27:
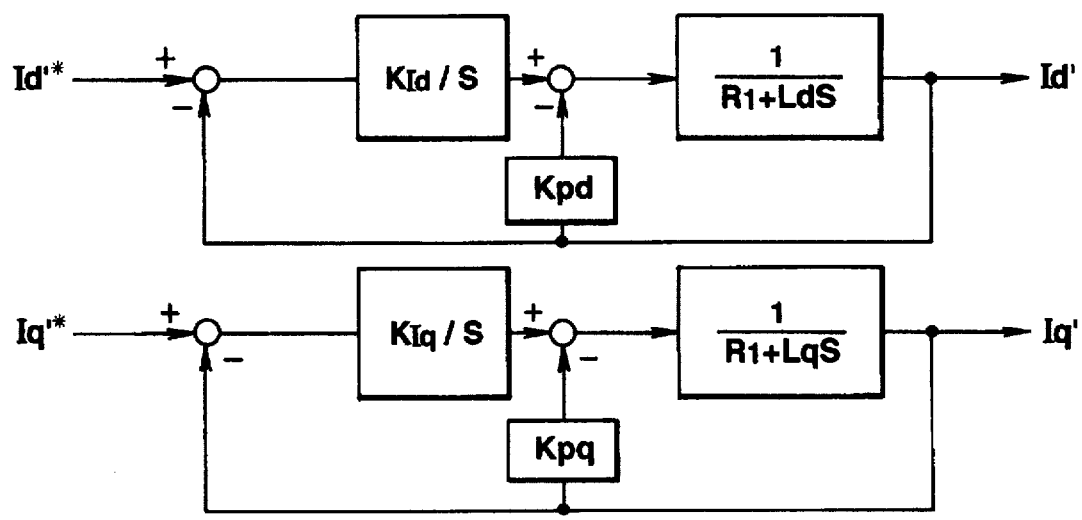
FIG. 27 is a block diagram of the d-axis and q-axis of FIG. 26.

FIGS. 26 and 27 show another embodiment of the non-interference processing of a IP control system. The structure of the IP control system of FIG. 26 is the same as that of the current control section shown in FIG. 21. The IP control system includes a proportion elements $K_{pd}$ and $K_{pq}$ and feed-forward compensations $\omega k_r L_d$, $\omega K_r L_q$ and $\omega K_r(\Lambda_m + M_f I_f)$ in addition to integral elements $K_{Id}/S$ and $K_{Iq}/S$. Accordingly, the control system of FIG. 26 also suppresses the disturbance. By the non-interference processing shown in FIG. 27, it becomes possible to separate d-axis and q-axis, and therefore the control performance is improved.

In this case, if the proportion gain is $K_{pd}=2\omega c \xi L_d - R_1$, and $K_{Id}=\omega c^2 L_1$ at d-axis, a transfer function between $I_d'$ and $I_d^{*'}$ is represented by the following equations (39) and (40).

$$\frac{I_d'}{I_d^{*'}} = \frac{K_{Id}/L_1}{S^2 + \left(\frac{R_1 + K_{pd}}{L_d}\right)S + \frac{K_{Id}}{L_1}} \quad (39)$$

Since this equation (39) is the same as a transfer function of a general secondary filter, it is represented as follows:

$$G(s) = \frac{\omega_c^2}{S^2 + 2\omega_c \xi S + \omega_c^2} \quad (40)$$

where ωc is a characteristic angle frequency; and ξ is a damping coefficient.

Accordingly, a current response is determined by the characteristic angle frequency ωc and the damping coefficient ξ. Similarly, the same relationship as to the q-axis is obtained by the similar assumption.

Figure 28A:
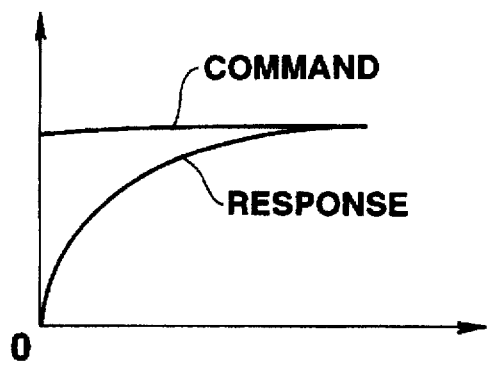
FIGS. 28A, 28B and 28C are explanatory views which show a difference between the PI control and the IP control.
Figure 28B:
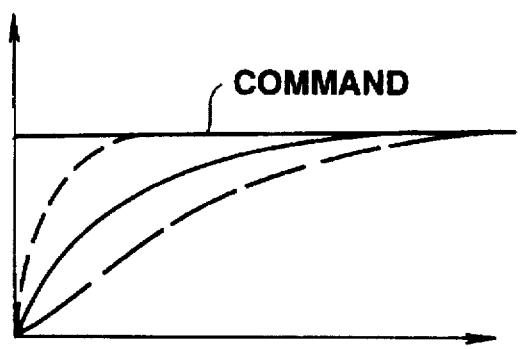

FIGS. 24 and 25 show the PI control system which is implemented by using "primary delay" and FIG. 26 and 27 show IP control system which implemented by using "secondary delay". That is, in PI control the difference between the command value and the feedback value is inputted to both the integral term and the proportion term, and $V_d^*$ and $V_q^*$ are outputted so as to decrease the difference to 0. By the implementation of non-interference processing, it becomes possible to control the response of the motor current ($I_d$, $I_q$) as "primary delay", as shown in FIG. 28A and by changing the gains ($K_{pd}$, $K_{pq}$) as shown in FIG. 28B, it can be treated as an arbitrary primary delay.

Figure 28C:
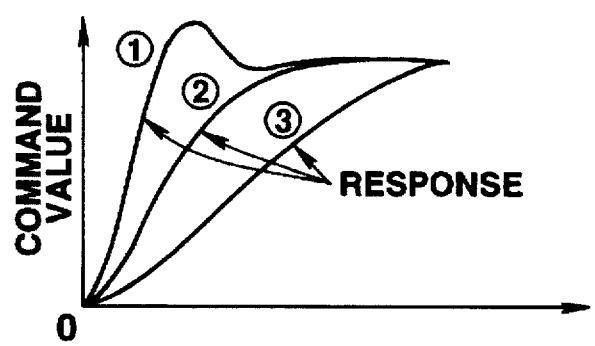

On the other hand, In IP control the difference between the command value and the feed back value is inputted only to the integral term, and the feed back value is inputted to the proportion term. Further $V_d^*$ and $V_q^*$ are outputted so as to decrease the difference to O. By the non-interference processing, it becomes possible to control the motor current by the secondary delay as shown in FIG. 28C, and the secondary delay is arbitrarily determined by changing the gains ($K_{pd}$, $K_{Id}$, $K_{pq}$ and $K_{Iq}$). Since the number of the gains to be changed is larger than that of the gain of the PI control, the degree of freedom of the response wave is increased. Further, it is possible to increase the response speed of the IP control rather than that of the PI control by the proper selection of the gain constituted by the same sample frequency.

When large quantity of noises are occurred in the feedback signals $I_d$ and $I_q$ in the control systems of FIGS. 24 and 26, the current values $I_d'$, $I_q'$ and If of the interference term may be exchanged by the command $I_d^*$, $I_q^*$ and $I_f^*$. That is, $\omega K_r L_q I_d'$ to $\omega K_r L_q I_d'^*$, $\omega K_r L_d I_q'$ to $\omega K_r L_d I_q'^*$, and $\omega K_r (\Lambda_m + M_f I_f)$ to $\omega K_r (\Lambda_m + M_f I_f^*)$. Where $I_f^*$ is a DC exiting current command.

Figure 29B:
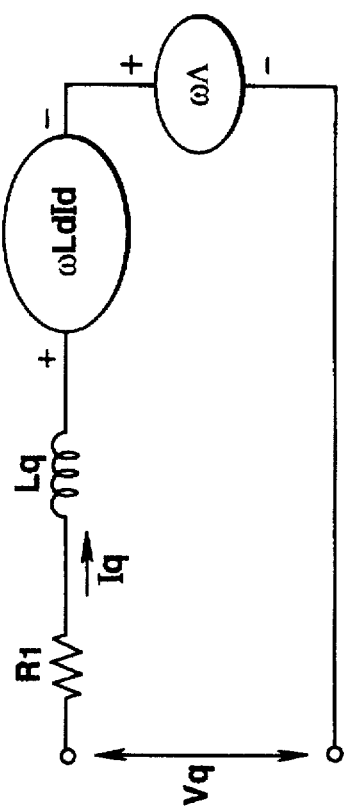
FIGS. 29A and 29B are equivalent circuits where iron loss is neglected and a transient condition is included.
Figure 29A:
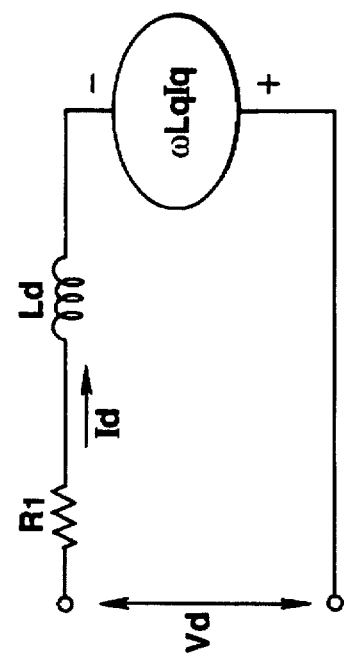

In the above explanation, the equivalent circuit including a transient condition taking account the iron loss is applied as promise. FIGS. 29A and 29B show equivalent circuits including the transient condition in case that the iron loss is neglected and corresponds to a case that the resistance $R_c$ in the circuits of FIGS. 22A and 22B is set infinity ($\infty$). The voltage equation in this case is represented by the following equation (41).

$$\begin{bmatrix} V_d \\ V_q \end{bmatrix} = \begin{bmatrix} R_1 + L_{dp} & -\omega L_q \\ \omega L_d & R_1 + L_{dp} \end{bmatrix} \begin{bmatrix} I_d \\ I_q \end{bmatrix} + \begin{bmatrix} 0 \\ \omega(\Lambda_m + M_f I_f) \end{bmatrix} \quad (41)$$

When $R_c = \infty$ is substituted into the equation (26), it becomes that $I_d = I_d'$ and the current control section shown in FIG. 21 controls $V_d$ and $V_q$ by the feedback of $I_d$ and $I_q$. Accordingly, it becomes unnecessary to transform $I_d'$ and $I_q'$ in FIG. 23. Since the interference term in the equation (41) of FIG. 29 becomes $-\omega L_q I_q$ at the d-axis side and $\omega L_d I_d +\omega(\Lambda_m - M_f I_f)$ at the q-axis side, the value may be compensated by the feed-forward compensation. Furthermore, as similar to FIGS. 25 and 27, the stationary term $(R_1 + L_{pd})I_d$ and the transient term $(R_1 + L_{qp})I_q$ are compensated by the PI control or IP control.

Figure 30:
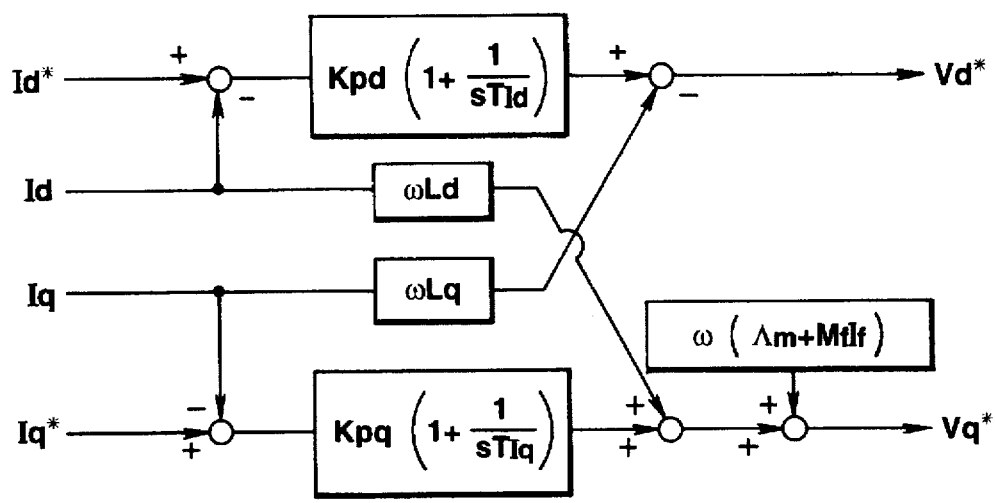
FIG. 30 is a block diagram of a non-interference PI control.
Figure 31:
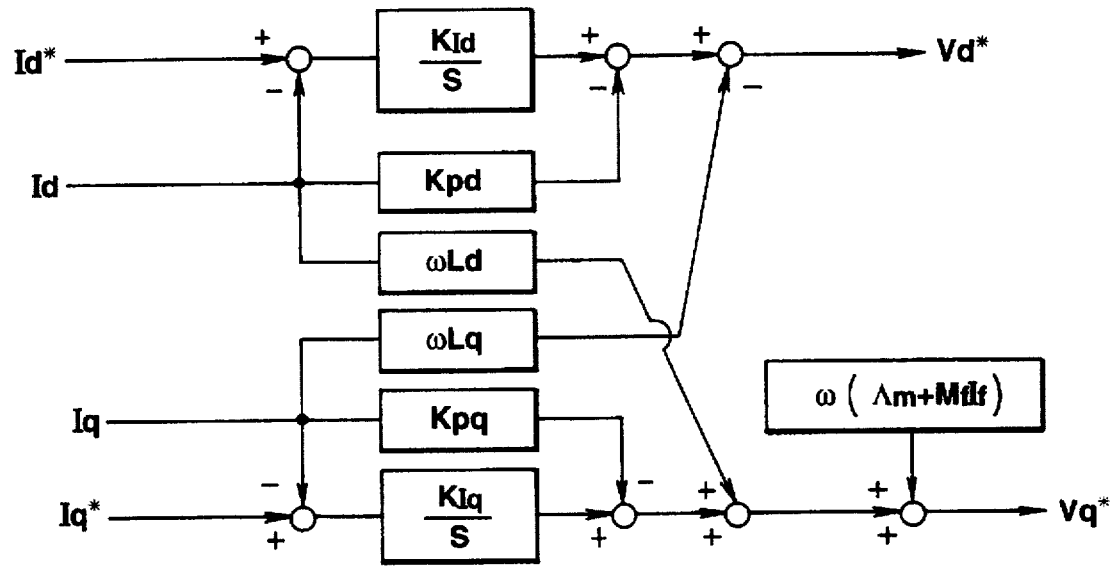
FIG. 31 is a block diagram of a non-interference IP control.

FIG. 30 shows a PI control system by which non-interference processing is implemented. FIG. 31 shows a IP control system. The difference between FIG. 24 and FIG. 26 is that a coefficient relating to the iron loss is omitted. The embodiments in FIGS. 30 and 31 are equivalent with embodiments that $I_d'^*$, $I_q'^*$, $I_d'$ and $I_q'$ are replaced with $I_d^*$, $I_q^*$, $I_d$ and $I_q$, respectively in the embodiments of FIGS. 25 and 27. Further, the response characteristics of FIGS. 30 and 31 are equivalent with the equations (38) and (39). Furthermore, it is a matter of fact that $I_d$, $I_q$ and If of the interference term may be replaced with $I_d^*$, $I_q^*$ and $I_f^*$, respectively.

Figure 32:
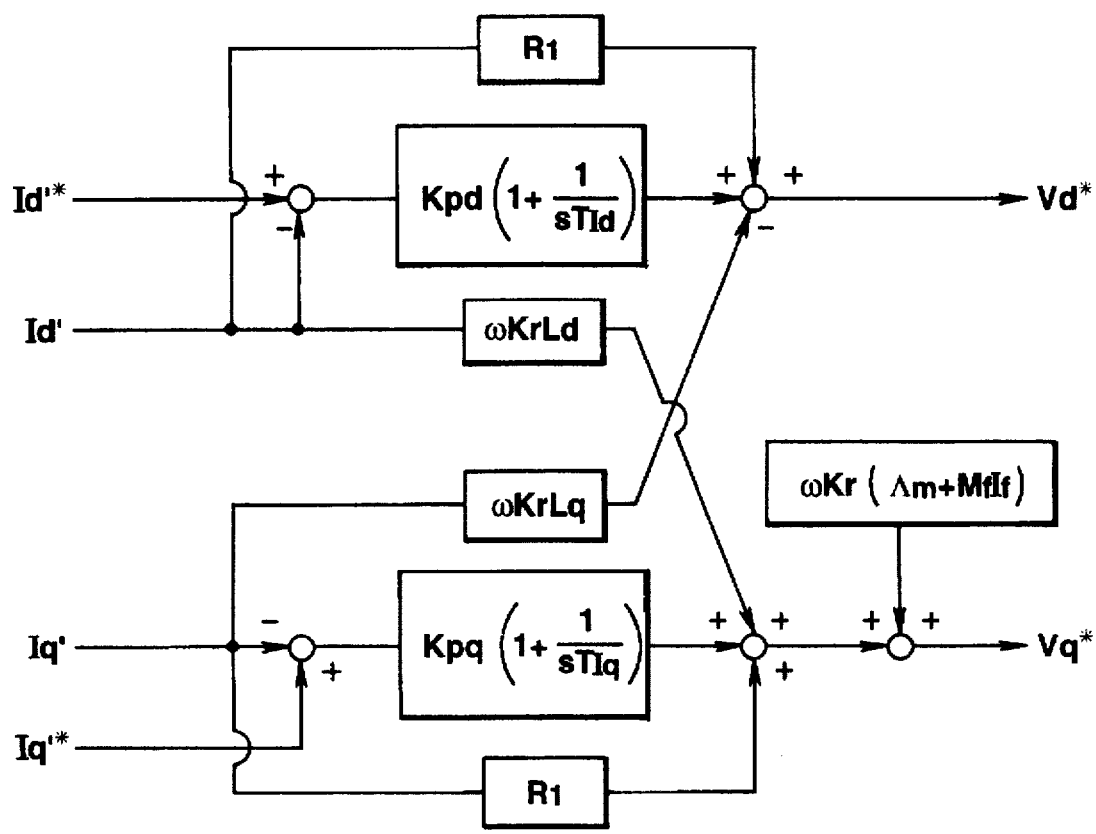
FIG. 32 is a block diagram of a PI control on the basis of a voltage model taking into consideration the iron loss.

FIG. 32 shows a PI control system which uses a voltage model and to which non-interference is applied.

Furthermore, stationary terms $R_1 I_d$ and $R_1 I_q'$ are compensated by a feed-forward on the d-axis and the q-axis. That is, the PI control is an equation shown by the equation (36), and is that the error of the voltage command of either the transient term of each motor constant ($L_d$, $L_q$, $R_1$ and the like) is compensated thereby. Also, instead of the compensation of $R_1$ term and the interference term with a current feedback value ($I_d'$, $I_q'$ and $I_f$) as mentioned above, it may be compensated by the current command ($I_d^*$, $I_q^*$ and $I_f^*$).

Figure 33:
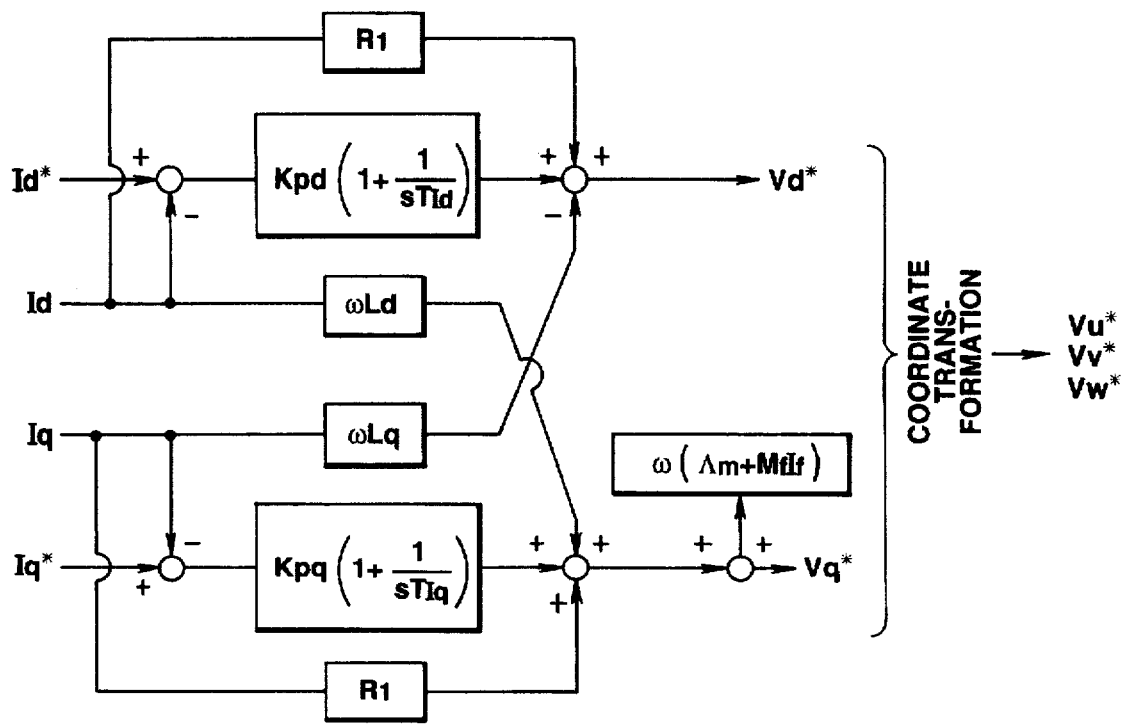
FIG. 33 is a block diagram of a PI control on the basis of a voltage model neglecting iron loss.

Although a control method of FIG. 33 has been shown and described so as to be controlled on the basis of the voltage equation (36) taking into consideration with the iron loss, if a case of FIG. 30 is applied thereto, the control method of FIG. 33 may be replaced with that on the basis of the voltage equation (41), where $R_1 I_d'$ and $R_1 I_q'$ of $R_1$ term are changed into $R_1 I_d$ and $R_1 I_q$, respectively. Thus, by treating the interference term by non-interference so as to independently control on the d-axis and the q-axis. That is, by applying the following interference term to the current control system by feed-forward, it becomes possible to independently control on the d-axis and the q-axis, and therefore the control response is improved.

d-axis side $\omega K_r L_q I_q'$

In case that iron loss is taken account, q-axis side $\omega K_r L_d I_d' + \omega K_r (\Lambda_m + M_f I_f)$ d-axis side $\omega L_q I_q$ In case that iron loss is neglected, q-axis side $\omega L_d I_d + \omega(\Lambda_m + M_f I_f)$ In case that noise is generated in the feedback signal ($I_d$, $I_q$ and $I_f$), by calculating the interference term with the command value ($I_d^*$, $I_q^*$ and $I_f^*$, or $I_d'^*$, $I_q'^*$ and $I_f^*$), it becomes possible to accomplish non-interference processing. Furthermore, by constructing the voltage model on the basis of the voltage equation of the hybrid excitation type permanent magnet synchronous motor, the control performance is improved.

Figure 34:
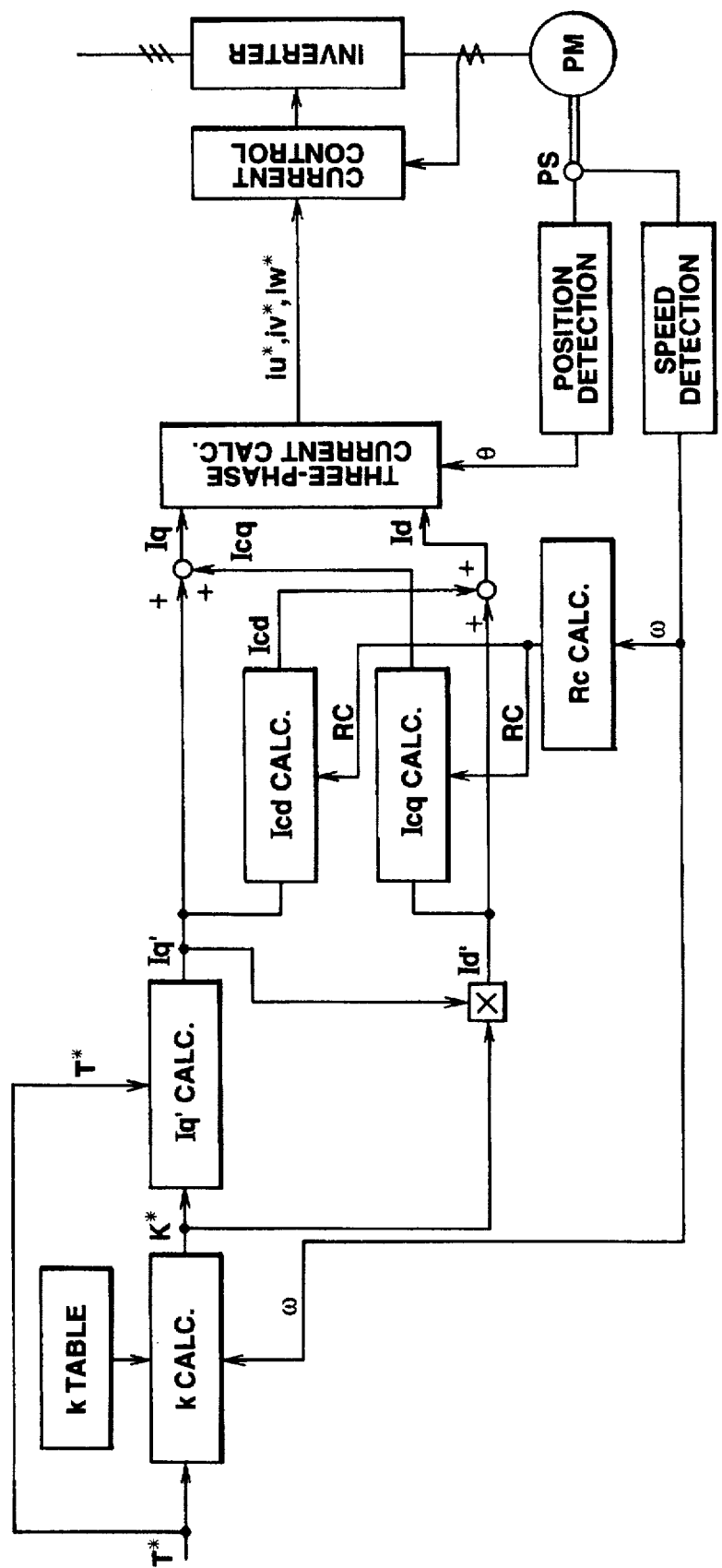
FIG. 34 is a block diagram of a control system of PM.

Although the explanation hereinbefore is relating to the hybrid excitation type permanent magnet synchronous motor, if the magnet flux $\Lambda$ is kept constant, the above-mentioned control systems may be applied to a PM motor. As shown in FIG. 34, by eliminating a circuit relating to $\Lambda$ from the control system of FIG. 16, a control system of the PM motor can be constituted.

As a result of the simulation of the maximum efficiency control of the PM motor, the constants of the embedded type PM motor are decided as follows and the k-table is set as shown in Table 3 and $\Lambda$-table is set at 1 in all region.

Figure 35:
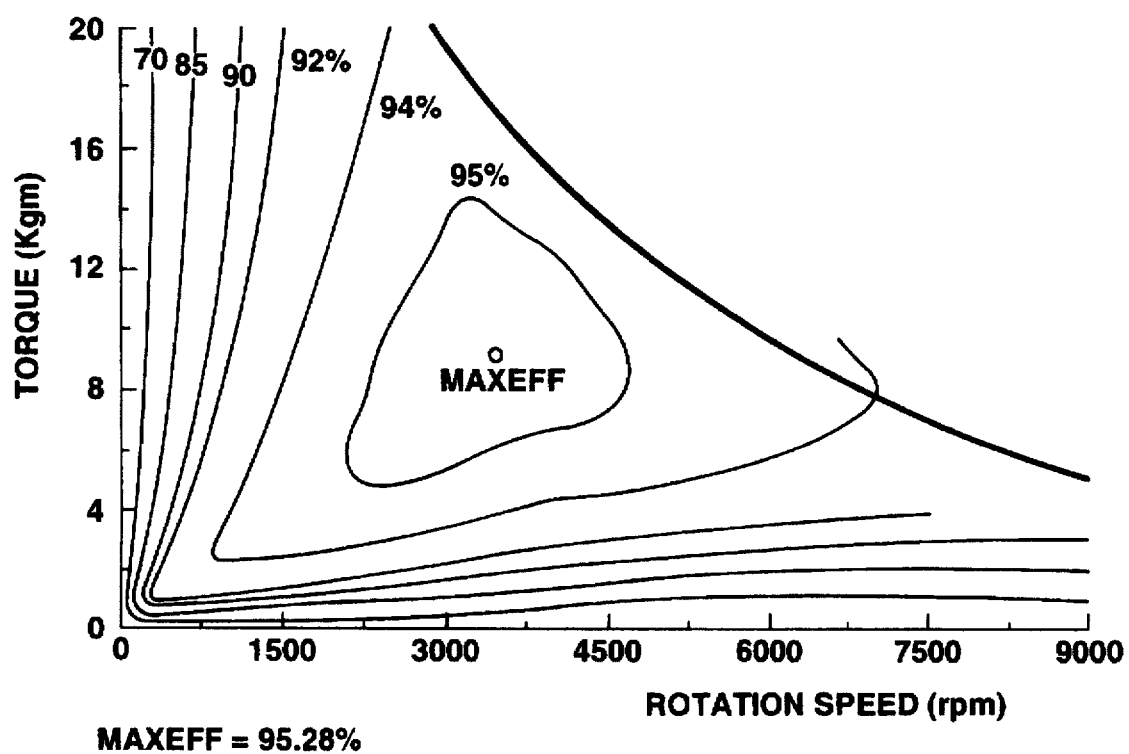
FIG. 35 is an efficiency map obtained by a simulation of the PM.
Figure 36:
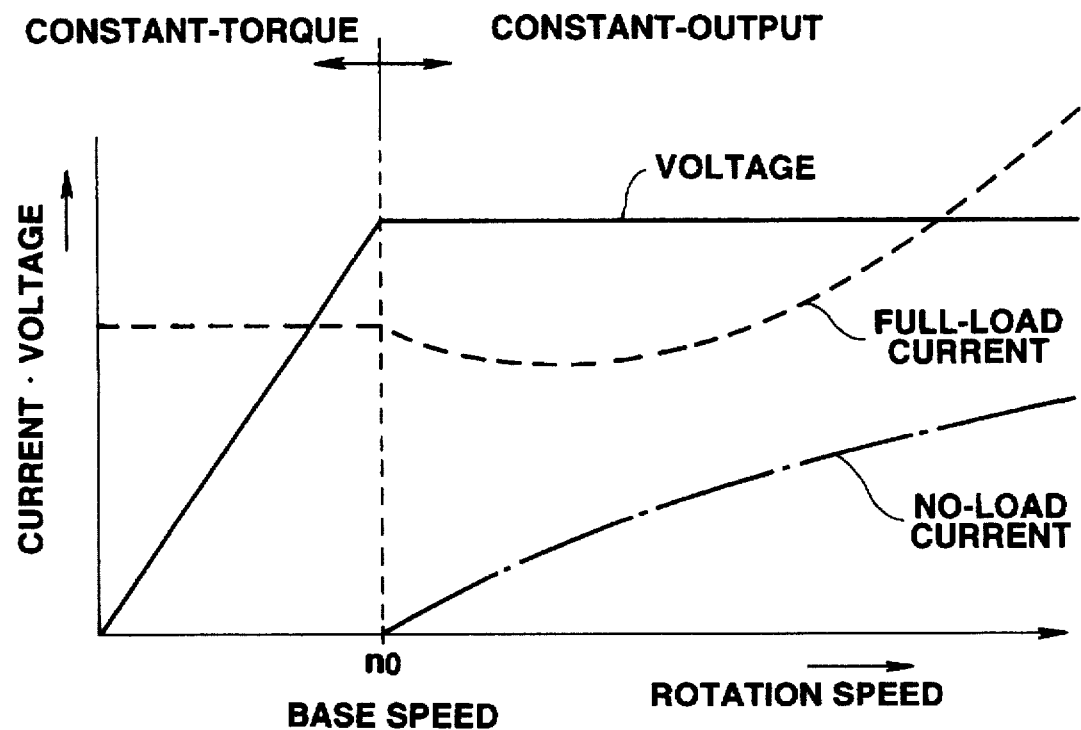
FIG. 36 is a characteristic curve in the torque-constant area and the output-constant area of a conventional motor control.

45 kw-8P-3000 rpm $R_1 = 0.0121\Omega$, $R_\infty = 28.8\Omega$ $L_q = 0.450$ mH, $L_d = 0.161$ mH $k_0 = 2.3337 \times 10^{-4}$, $L_0 = 0.0893$ $k_1 = 0.0156/2$, $k_2 = 9.02/2$ Therefore, the efficiency map of the embedded type PM motor was obtained as shown in FIG. 35, and MAXEFF= 95.28% was obtained.

TABLE 3

| | k–TABLE(maximum efficiency control) All of Λ equal to 1. (rpm) | | | | | | | | | |
|---|---|---|---|---|---|---|---|---|---|---|
| | 0 | 1000 | 2000 | 3000 | 4000 | 5000 | 6000 | 7000 | 8000 | 9000 |
| Torque (kg · m) | | | | | | | | | | |
| 0 | −0.035 | −0.035 | −0.035 | −0.035 | −11.43 | −57.31 | −57.31 | −57.31 | −57.3 | −57.31 |
| 2 | −0.176 | −0.231 | −0.365 | −0.577 | −0.966 | −3.488 | −6.314 | −9.515 | −11.43 | −14.30 |
| 4 | −0.287 | −0.344 | −0.445 | −0.625 | −0.869 | −2.356 | −3.732 | −5.145 | −6.314 | −7.116 |
| 6 | −0.384 | −0.424 | −0.532 | −0.675 | −1.000 | −2.145 | −3.271 | −4.332 | −5.145 | −6.314 |
| 8 | −0.445 | −0.488 | −0.577 | −0.727 | −1.235 | −2.246 | −3.271 | −4.332 | −5.145 | −6.314 |
| 10 | −0.510 | −0.554 | −0.625 | −0.754 | −1.483 | −2.475 | −3.488 | −4.705 | 0 | 0 |
| 12 | −0.532 | −0.577 | −0.675 | −0.781 | −1.664 | −2.748 | −4.011 | −5.672 | 0 | 0 |
| 14 | −0.577 | −0.601 | −0.700 | −0.900 | −1.963 | −3.078 | −4.705 | 0 | 0 | 0 |
| 16 | −0.601 | −0.625 | −0.727 | −0.072 | −2.145 | −3.732 | 0 | 0 | 0 | 0 |
| 18 | −0.625 | −0.649 | −0.754 | −0.280 | −2.475 | −4.000 | 0 | 0 | 0 | 0 |
| 20 | −0.625 | −0.675 | −0.754 | −0.428 | −2.904 | 0 | 0 | 0 | 0 | 0 |

During regenerating, $I_q < 0$, $k > 0$.

In a maximum torque control, when the torque T and the speed ω are applied, the primary current $I_1$ becomes minimum at the maximum torque. Accordingly, k and Λ or $I_d$, $I_q$ and Λ may be obtained. That is, $I_d$, $I_q$ of the equation (25) is obtained from the equation (32), and $I_1$ is obtained from the equation (35). Therefore, k and Λ, or $I_d$, $I_q$ and Λ by which $I_1$ becomes minimum relative to arbitrary ω and T may be obtained by repeat calculations.

With the thus arranged embodiments, by proper determination of k and Λ by k-table and Λ-table or the determination of $I_d$, $I_q$ and Λ by $I_d$, $I_q$ and Λ table, the operable area of the hybrid excitation type permanent magnet synchronous motor, d.c. machine and a PM motor is extended. Furthermore, it becomes possible to implement the maximum efficiency control and the maximum torque control. Additionally, it becomes possible to implement the non-interference control by removing the disturbance by the feed-forward control of the interference term.

What is claimed is:

1. A method of controlling a hybrid excitation type synchronous motor, the hybrid excitation type synchronous motor having a field of a permanent magnet and a dc excitation coil, magnetic flux of the field being controlled by adjusting dc electric current of the dc excitation coil, said method comprising the steps of:

selecting at least one of steps (a) and (b) to control the motor, wherein step (a) includes the step of adjusting the dc electric current of the dc excitation coil to keep constant the magnetic flux of the field when a rotation speed of the motor is smaller than a predetermined base speed and to change the magnetic flux of the field in inverse proportion with the rotation speed of the motor when the rotation speed is larger than the predetermined base speed; and step (b) includes the steps of adjusting the dc electric current of the dc excitation coil to vary the magnetic flux of the field and controlling electric current and voltage at an armature coil of the motor such that a current ratio of a direct-axis component and a quadrature-axis component, which components are obtained by dividing an electric current at the armature coil into the direct-axis component and the quadrature-axis component relative to the voltage induced in the armature coil, is kept constant.

2. A method of controlling a hybrid excitation type synchronous motor, the hybrid excitation type synchronous motor having a field of a permanent magnet and a dc excitation coil, magnetic flux of the field being controlled by adjusting dc electric current of the dc excitation coil, said method comprising the steps of:

dividing an electric current at an armature coil of the motor into a direct-axis component and a quadrature-axis component relative to the voltage induced in the armature coil; and adjusting the dc electric current of the dc excitation coil to vary the magnetic flux of the field and controlling electric current and voltage at the armature coil so that the quadrature-axis component of the armature voltage is zero.

3. A method of controlling a hybrid excitation type synchronous motor, the hybrid excitation type synchronous motor having a field of a permanent magnet and a dc excitation coil, magnetic flux of the field being controlled by adjusting dc electric current of the dc excitation coil, said method comprising the steps of:

selecting at least one of steps (a) and (b) to control the motor, wherein step (a) includes the steps of adjusting the dc electric current of the dc excitation coil to vary the magnetic flux of the field and controlling electric current and voltage at an armature coil of the motor so that a current ratio of a direct-axis component and a quadrature-axis component, which components are obtained by dividing an electric current at the armature coil into the direct-axis component and the quadrature-axis component relative to the voltage induced in the armature coil, is kept constant; and step (b) includes the steps of adjusting the dc electric current of the dc excitation coil to vary the magnetic flux of the field and controlling electric current and voltage to the armature so that the quadrature-axis component of the armature voltage is zero, said selecting being made in accordance with the size of the quadrature-axis component of the armature current.

4. A method as claimed in claim 3, wherein the current ratio is determined in a constant-output control area.

5. A method of controlling a hybrid excitation type synchronous motor, the hybrid excitation type synchronous motor having a field of a permanent magnet and a dc excitation coil, magnetic flux of the field being controlled by adjusting dc electric current of the dc excitation coil, said method comprising the steps of:

determining a current ratio of a direct-axis component and a quadrature-axis component, which components are obtained by dividing an electric current at an armature coil of the motor into the direct-axis component and the quadrature-axis component relative to the voltage induced in the armature coil, from a preset magnetic flux table and a current ratio table according to a torque command and a rotation speed of the motor; and adjusting the dc electric current of the dc excitation coil to vary the magnetic flux of the field and controlling current and voltage at the armature coil so as to keep said current ratio of the direct-axis component and the quadrature-axis component at the determined current ratio.

6. A method of controlling a motor having a field of a permanent magnet and a dc excitation coil, magnetic flux of the field being controlled by adjusting dc electric current of the dc excitation coil, said method comprising the steps of:

determining a current ratio of a direct-axis component and a quadrature-axis component, which components are obtained by dividing an electric current at an armature coil of the motor into the direct-axis component and the quadrature-axis component relative to the voltage induced in the armature coil, from a preset current ratio table according to a torque command and a rotation speed of the motor; and adjusting the dc electric current of the dc excitation coil to vary the magnetic flux of the field and controlling current and voltage at the armature coil so as to keep said current ratio of the direct-axis component and the quadrature-axis component at the determined current ratio.

7. A method of controlling a hybrid excitation type synchronous motor, the hybrid excitation type synchronous motor including a field of a permanent magnet and a dc excitation coil, magnetic flux of the field being controlled by adjusting dc electric current of the dc excitation coil, said method comprising the steps of:

determining a current ratio of a direct-axis component and a quadrature-axis component, which components are obtained by dividing an electric current at an armature coil of the motor into the direct-axis component and the quadrature-axis component relative to the voltage induced in the armature coil, from a preset magnetic flux table and a preset component current table of each component according to a torque command and a rotation speed of the motor; and adjusting the dc electric current of the dc excitation coil to vary the magnetic flux of the field and controlling current and voltage at the armature coil and the magnetic flux of the field so as to keep said current ratio of the direct-axis component and the quadrature-axis component at the determined current ratio.

8. A method of controlling a motor including a field of a permanent magnet and a dc excitation coil, magnetic flux of the field being controlled by adjusting dc electric current of the dc excitation coil, said method comprising the steps of:

determining a current ratio of a direct-axis component and a quadrature-axis component, which components are obtained by dividing an electric current at an armature coil of the motor into the direct-axis component and the quadrature-axis component relative to the voltage induced in the armature coil, from a preset component current table according to a torque command and a rotation speed of the motor; and adjusting the dc electric current of the dc excitation coil to vary the magnetic flux of the field and controlling current and voltage at the armature coil so as to keep said current ratio of the direct-axis component and the quadrature-axis component at the determined current ratio.

9. A method as claimed in claim 5, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each point, the current ratio and the magnetic flux, at which the efficiency of the motor becomes maximum, are obtained.

10. A method as claimed in claim 6, wherein the current ratio table has been previously obtained relative to the rotation speed and the torque of the motor in such a manner that a plurality of points for calculating an efficiency of the motor within an operated rotation speed range and an operated torque range are determined, and at each point, the current ratio, at which the efficiency of the motor becomes maximum, is obtained.

11. A method as claimed in claim 5, wherein the current ratio table and the magnetic flux table have been previously obtained relative to the rotation speed and the torque of the motor in such a manner that a plurality of points for calculating efficiency of the motor within an operated rotation speed range and an operated torque range are determined, and at each point, the current ratio and the magnetic flux, at which the efficiency of the motor becomes minimum, are obtained.

12. A method as claimed in claim 7, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each calculating point, the direct-axis component of the current, the quadrature-axis component of the current and the magnetic flux, at which the efficiency of the motor becomes maximum, are obtained.

13. A method as claimed in claim 7, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each calculating point, the direct-axis component of the current, the quadrature-axis component of the current and the magnetic flux, at which the current of the armature coil becomes minimum, are obtained.

14. A method as claimed in claim 8, wherein the current ratio table has been previously obtained relative to the rotation speed and the torque of the motor in such a manner that a plurality of points for calculating an efficiency of the motor within an operated rotation speed range and an operated torque range are determined, and at each calculating point, the direct-axis component of the current, the quadrature-axis component of the current and the magnetic flux, at which the efficiency of the motor becomes maximum, are obtained.

15. A method of controlling a hybrid excitation type motor including a field of a permanent magnet and a dc excitation coil, magnetic flux of the field being controlled by adjusting dc electric current of the dc excitation coil, comprising the steps of:

adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil;

detecting a current of each component;

detecting the dc electric current of the dc excitation coil; and implementing a feed-forward compensation of the current of each component by calculating an interference component relative to the current of each component from the detected current of each component and the detected dc electric current.

16. A method of controlling a hybrid excitation type motor having a field of a permanent magnet and a dc excitation coil, magnetic flux of the field being controlled by adjusting dc electric current of the dc excitation coil, comprising the steps of:

adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil; and implementing a feed-forward compensation of the current of each component by calculating an interference component relative to the current of each component from a current command value and a dc electric current command value.

17. A method of controlling a hybrid excitation type motor having a field of a permanent magnet and a dc excitation coil, magnetic flux of the field being controlled by adjusting dc electric current of the dc excitation coil, comprising the steps of:

adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil;

detecting a current of each component;

detecting the dc electric current of the dc excitation coil; and implementing a feed-forward compensation of the current of each component by producing a voltage model from a voltage equation, the detected current of each component and the detected dc electric current.

18. A method of controlling a hybrid excitation type motor having a field of a permanent magnet and a dc excitation coil, magnetic flux of the field being controlled by adjusting dc electric current of the dc excitation coil, comprising the steps of:

adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil; and implementing a feed-forward compensation of the current of each component by producing a voltage model from a voltage equation, a current command value and a dc electric current command value.

19. A control system for controlling a hybrid excitation type synchronous motor, the hybrid excitation type synchronous motor having a field of a permanent magnet and a dc excitation coil, magnetic flux of the field being controlled by adjusting dc electric current of the dc excitation coil, said control system comprising:

means for selecting control by at least one of first control means and second control means, wherein said first control means includes means for adjusting the dc electric current of the dc excitation coil to keep constant the magnetic flux of the field when a rotation speed of the motor is smaller than a predetermined base speed and to change the magnetic flux of the field in inverse proportion with the rotation speed of the motor when the rotation speed is larger than the predetermined base speed; and said second control means includes means for adjusting the dc electric current of the dc excitation coil to vary the magnetic flux of the field and controlling electric current and voltage at an armature coil of the motor such that a current ratio of a direct-axis component and a quadrature-axis component which components are obtained by dividing an electric current at the armature coil into the direct-axis component and the quadrature-axis component relative to the voltage induced in the armature coil, is kept constant.

20. A control system for controlling a hybrid excitation type synchronous motor, the hybrid excitation type synchronous motor having a field of a permanent magnet and a dc excitation coil, magnetic flux of the field being controlled by adjusting dc electric current of the dc excitation coil, said control system comprising:

dividing means for dividing an electric current to at armature coil of the motor into a direct-axis component and a quadrature-axis component relative to the voltage induced in the armature coil; and control means for adjusting the dc electric current of the dc excitation coil to vary the magnetic flux of the field and controlling electric current and voltage at the armature coil so that the quadrature-axis component of the armature voltage is zero.

21. A control system for controlling a hybrid excitation type synchronous motor, the hybrid excitation type synchronous motor having a field of a permanent magnet and a dc excitation coil, magnetic flux of the field being controlled by adjusting dc electric current of the dc excitation coil, said control system comprising:

means for selecting at least one of current ratio control means and voltage component control means to control the motor, wherein said current ratio control means includes means for adjusting the dc electric current of the dc excitation coil to vary the magnetic flux of the field and controlling electric current and voltage at an armature coil of the motor so that a current ratio of a direct-axis component and a quadrature-axis component, which components are obtained by dividing an electric current at the armature coil into the direct-axis component and the quadrature-axis component relative to the voltage induced in the armature coil, is kept constant; and said voltage component control means includes means adjusting the dc electric current of the dc excitation coil to vary the magnetic flux of the field and controlling electric current and voltage to the armature so that the quadrature-axis component of the armature voltage is zero, said means for selecting being made in accordance with the size of the quadrature-axis component of the armature current.

22. A control system as claimed in claim 21, wherein the current ratio is determined in a constant-output control area.

23. A control system for controlling a hybrid excitation type synchronous motor, the hybrid excitation type synchronous motor having a field of a permanent magnet and a dc excitation coil, magnetic flux of the field being controlled by adjusting dc electric current of the dc excitation coil, said control system comprising:

determining means for determining a current ratio of a direct-axis component and a quadrature-axis component, which components are obtained by dividing an electric current at an armature coil of the motor into the direct-axis component and the quadrature-axis component relative to the voltage induced in the armature coil, from a preset magnetic flux table and a current ratio table according to a torque command and a rotation speed of the motor; and control means for adjusting the dc electric current of the dc excitation coil to vary the magnetic flux of the field and controlling current and voltage at the armature coil and the magnetic flux of the field so as to keep said current ratio of the direct-axis component and the quadrature-axis component at the determined current ratio.

24. A control system for controlling a motor having a field of a permanent magnet and a dc excitation coil, magnetic flux of the field being controlled by adjusting dc electric current of the dc excitation coil, said control system comprising:

determining means for determining a current ratio of a direct-axis component and a quadrature-axis component, which components are obtained by dividing an electric current at an armature coil of the motor into the direct-axis component and the quadrature-axis component relative to the voltage induced in the armature coil, from a preset current ratio table according to a torque command and a rotation speed of the motor; and control means for adjusting the dc electric current of the dc excitation coil to vary the magnetic flux of the field and controlling current and voltage at the armature coil so as to keep said current ratio of the direct-axis component and the quadrature-axis component at the determined current ratio.

25. A control system for controlling a hybrid excitation type synchronous motor, the hybrid excitation type synchronous motor including a field of a permanent magnet and a dc excitation coil, magnetic flux of the field being controlled by adjusting dc electric current of the dc excitation coil, said control system comprising:

determining means for determining a current ratio of a direct-axis component and a quadrature-axis component, which components are obtained by dividing an electric current at an armature coil of the motor into the direct-axis component and the quadrature-axis component relative to the voltage induced in the armature coil, from a preset magnetic flux table and a preset component current table of each component according to a torque command and a rotation speed of the motor; and control means for adjusting the dc electric current of the dc excitation coil to vary the magnetic flux of the field and controlling current and voltage at the armature coil and the magnetic flux of the field so as to keep said current ratio of the direct-axis component and the quadrature-axis component at the determined current ratio.

26. A control system for controlling a motor including a field of a permanent magnet and a dc excitation coil, magnetic flux of the field being controlled by adjusting dc electric current of the dc excitation coil, said control system comprising:

determining means for determining a current ratio of a direct-axis component and a quadrature-axis component, which components are obtained by dividing an electric current at an armature coil of the motor into the direct-axis component and the quadrature-axis component relative to the voltage induced in the armature coil, from a preset component current table according to a torque command and a rotation speed of the motor; and control means for adjusting the dc electric current of the dc excitation coil to vary the magnetic flux of the field and controlling current and voltage at the armature coil so as to keep said current ratio of the direct-axis component and the quadrature-axis component at the determined current ratio.

27. A control system as claimed in claim 23, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each point, the current ratio and the magnetic flux, at which the efficiency of the motor becomes maximum, are obtained.

28. A control system as claimed in claim 24, wherein the current ratio table has been previously obtained relative to the rotation speed and the torque of the motor in such a manner that a plurality of points for calculating an efficiency of the motor within an operated rotation speed range and an operated torque range are determined, and at each point, the current ratio, at which the efficiency of the motor becomes maximum, is obtained.

29. A control system as claimed in claim 23, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each point, the current ratio and the magnetic flux, at which the efficiency of the motor becomes minimum, are obtained.

30. A control system as claimed in claim 25, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each calculating point, the direct-axis component of the current, the quadrature-axis component of the current and the magnetic flux, at which the efficiency of the motor becomes maximum, are obtained.

31. A control system as claimed in claim 25, wherein the current ratio table and the magnetic flux table have been previously obtained relative to the rotation speed and the torque of the motor in such a manner that a plurality of points for calculating an efficiency of the motor within an operated rotation speed range and an operated torque range are determined, and at each calculating point, the direct-axis component of the current, the quadrature-axis component of the current and the magnetic flux, at which the current of the armature coil becomes minimum, are obtained.

32. A control system as claimed in claim 26, wherein the current ratio table has been previously obtained relative to the rotation speed and the torque of the motor in such a manner that a plurality of points for calculating an efficiency of the motor within an operated rotation speed range and an operated torque range are determined, and at each calculating point, the direct-axis component of the current, the quadrature-axis component of the current and the magnetic flux, at which the efficiency of the motor becomes maximum, are obtained.

33. A control system for controlling a hybrid excitation type motor having a field of a permanent magnet and a dc excitation coil, magnetic flux of the field being controlled by adjusting dc electric current of the dc excitation coil, comprising:

control means for adjusting the dc electric current of the dc excitation to vary the magnetic flux of the motor and controlling a current of a direct-axis component and a current of a quadrature-axis component, which components are obtained by dividing an electric current at an armature coil of the motor into the direct-axis component and the quadrature-axis component relative to the voltage induced in the armature coil;

means for detecting a current of each component;

means for detecting the dc electric current of the dc excitation coil; and means for implementing a feed-forward compensation of the current of each component by calculating an interference component relative to the current of each component from the detected current of each component and the detected dc electric current.

34. A control system for controlling a hybrid excitation type motor having a field of a permanent magnet and a dc excitation coil, magnetic flux of the field being controlled by adjusting dc electric current of the dc excitation coil, comprising:

means for adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil; and means for implementing a feed-forward compensation of the current of each component by calculating an interference component relative to the current of each component from a current command value and a dc electric current command value.

35. A control system for controlling a hybrid excitation type motor, comprising:

means for adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil;

means for detecting a current of each component;

means for detecting the dc electric current of the dc excitation coil; and means for implementing a feed-forward compensation of the current of each component by producing a voltage model from a voltage equation, the detected current of each component and the detected dc electric current.

36. A control system for controlling a hybrid excitation type motor having a field of a permanent magnet and a dc excitation coil, magnetic flux of the field being controlled by adjusting dc electric current of the dc excitation coil, comprising:

means for adjusting the dc electric current of the dc excitation coil to vary the magnetic flux of the field and controlling a current of a direct-axis component and a current of a quadrature-axis component, which components are obtained by dividing an electric current at an armature coil of the motor into the direct-axis component and the quadrature-axis component relative to the voltage induced in the armature coil; and means for implementing a feed-forward compensation of the current of each component by producing a voltage model from a voltage equation, a current command value and a dc electric current command value.

* * * * *